United States Patent
Maeno

(10) Patent No.: US 8,045,754 B2
(45) Date of Patent: Oct. 25, 2011

(54) PROCESSOR AND METHOD FOR PROCESSING IMAGE TO UPDATE INFORMATION EMBEDDED UNREADABLY IN A PRINTED DOCUMENT

(75) Inventor: Kurato Maeno, Saitama (JP)

(73) Assignee: Oki Data Corporation, Tokyo (JP)

( * ) Notice: Subject to any disclaimer, the term of this patent is extended or adjusted under 35 U.S.C. 154(b) by 913 days.

(21) Appl. No.: 12/071,663

(22) Filed: Feb. 25, 2008

(65) Prior Publication Data
US 2009/0010487 A1    Jan. 8, 2009

(30) Foreign Application Priority Data

Feb. 27, 2007 (JP) ................................ 2007-047416

(51) Int. Cl.
  *G06K 9/00* (2006.01)

(52) U.S. Cl. ........................................... 382/100

(58) Field of Classification Search .................. 382/100
See application file for complete search history.

(56) References Cited

U.S. PATENT DOCUMENTS

| | | | | |
|---|---|---|---|---|
| 5,909,539 | A * | 6/1999 | Chikauchi | 358/1.18 |
| 6,535,617 | B1 * | 3/2003 | Hannigan et al. | 382/100 |
| 7,589,862 | B2 * | 9/2009 | Uchida et al. | 358/1.9 |
| 2003/0021442 | A1 | 1/2003 | Suzaki | |
| 2004/0223612 | A1 * | 11/2004 | Kamijoh et al. | 380/201 |
| 2007/0005977 | A1 | 1/2007 | Tohne et al. | |
| 2007/0092106 | A1 * | 4/2007 | Sakazawa et al. | 382/100 |

FOREIGN PATENT DOCUMENTS

| | | |
|---|---|---|
| JP | 2005-269551 | 9/2005 |
| JP | 2005-286963 | 10/2005 |
| JP | 2006-253839 | 9/2006 |

* cited by examiner

*Primary Examiner* — Matthew Bella
*Assistant Examiner* — Dennis Rosario
(74) *Attorney, Agent, or Firm* — Rabin & Berdo, P.C.

(57) ABSTRACT

In a watermark processing system, a watermark detector detects first information represented by a watermark from an image, a watermark encoder decodes and error-corrects the first information and re-encodes it to second information, and a watermark eraser identifies the position of the tint-block pattern included in the watermark according to the second information and produces a watermark-erased image from which the watermark is erased.

18 Claims, 25 Drawing Sheets

PATTERN WITH '1' RECORDED

PATTERN WITH '0' RECORDED

PATTERN TO BE EMBEDDED

PRIOR ART

FIG. 3

| INFORMATION BLK A | INFORMATION BLK B | INFORMATION BLK A | INFORMATION BLK B |
|---|---|---|---|
| INFORMATION BLK C | INFORMATION BLK D | INFORMATION BLK C | INFORMATION BLK D |
| INFORMATION BLK A | INFORMATION BLK B | INFORMATION BLK A | INFORMATION BLK B |
| INFORMATION BLK C | INFORMATION BLK D | INFORMATION BLK C | INFORMATION BLK D |
| INFORMATION BLK A | INFORMATION BLK B | INFORMATION BLK A | INFORMATION BLK B |
| INFORMATION BLK C | INFORMATION BLK D | INFORMATION BLK C | INFORMATION BLK D |

PRIOR ART

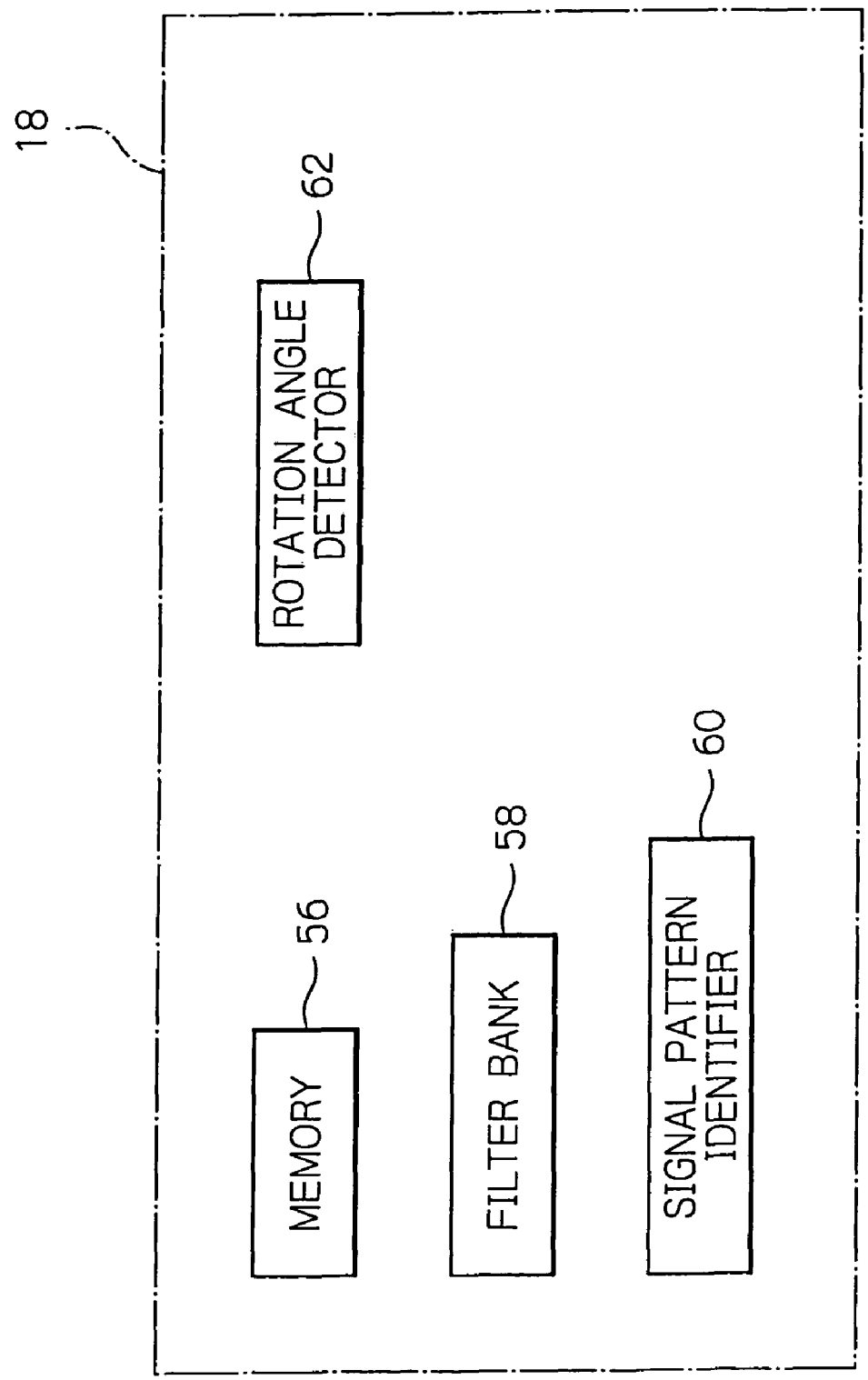

PROCESSOR AND METHOD FOR PROCESSING IMAGE TO UPDATE INFORMATION EMBEDDED UNREADABLY IN A PRINTED DOCUMENT

BACKGROUND OF THE INVENTION

1. Field of the Invention

The present invention relates to a device and a method for processing an image, and, in particular, to an image processor that converts information embedded in a print medium in an unreadable format to an electronic form and erases and updates the information embedded in the unreadable format, and also to an image processing method for reading, erasing and updating information embedded in an unreadable format.

2. Description of the Background Art

One of the recent social problems is a number of information-leakage incidents having occurred from, for example, printed documents. In particular, the information-leakage incidents from printed documents are described in "2004 Investigative Report on Information Security Incidents", Japan Network Security Association (JNSA), January 2006. The report, which is herein referenced merely as a document teaching the background art, says that such incidents occupy about as much as 46% of the entire information-leakage incidents. Immediate measures are required.

As measures against information leakage from printed materials, printed materials may be provided with a function of identifying the routing path of the printed materials, thereby facilitating diagnosis of information leakage. This can effectively exert suppression of information leakage. That function includes, for example, a process of embedding in an unreadable format information on a person and a place concerned with printing the printed materials. In order to identify the leakage path, it is preferable to be able to derive, from the printed materials, information on all people and places concerned with the distribution of the printed materials. Technology to embed into printed materials in an unreadable format information on a historical record obtained on a routing path of a printed material till it is actually printed is disclosed by, for example, JP Patent Laid-Open Publication No. 2005-286963, US Patent Application Publication No. US2003/0021442A1 to Suzaki, and JP Patent Laid-Open Publication No. 2005-269551.

JP 2005-286963 discloses a scheme in which a plurality of small dots are arranged to record information. The small dots include an area-prescribing dot which prescribes a unit area that represents information, and an information dot which represents information using a relative position in the unit area prescribed by the area-prescribing dot, thus being arranged to embed information. Information is read out by detecting an area-prescribing dot to know a unit area, recognizing the position of the information dot in the unit area, and determining the relative position of the information dot from the unit area.

Suzaki and JP 2005-269551 disclose a scheme in which a dot pattern, referred to as a signal pattern, is provided in which dots are arranged with the propagation direction and wavelength of waves changed so that each signal pattern is provided with one or more symbols and the signal patterns are combined and arranged to thereby embed information. Information is read out by detecting a signal pattern wave using a Gabor filter to identify a symbol, and decoding information from the resulting symbol using an error correction code and a determination on majority rule.

In any of the above schemes, the patterns including dots carrying information have different shapes depending on the embedded information, although the patterns are averagely almost uniform in concentration distribution. That causes information, when embedded even in the entire background of a document image, to be visually inconspicuous, thus not significantly affecting the readability of the original document image. The dots of a tint-block may be changed in diameter and density so as to vary the concentration without affecting the embedded information, thereby sometimes intentionally drawing a picture and a letter on the tint-block.

With reference to FIGS. 1A, 1B, and 1C of the accompanying drawings, Suzaki and JP 2005-269551 disclose signal patterns specific thereto. FIG. 1A shows an example of signal pattern recording binary information "1". FIG. 1B shows an example of signal pattern recording binary information "0". FIG. 1C shows an example of pattern that is formed when the embedded information is three rows by four columns, corresponding to 12 bits.

Such signal patterns are repeatedly subject to error correction encoding and information processing before being embedded in order to avoid failure in reading out information caused by a corrugation or a stain of printed materials or copying, aging or cutting out printed materials. FIG. 2 schematically shows an example where 256-bit information is embedded.

With reference to FIG. 2, 256-bit information 500 is divided into four sets of 64-bit information 502, 504, 506, and 508. Each of the sets of 64-bit information is added with 4 bits of index information 510 different from each other and 12 bits of page information 512 common to each other for identifying a page to thereby produce four sets of 80-bit information 514. The index information 510 may be represented by, for example, '0000', '0001', '0010', or '0100'.

Each 80-bit information is encoded to an error correction BCH (144, 80) code (Bose-Chaudhuri-Hocquenghem) 516, which is 8-bit correctable and has its code length of 144 bits. The encoded information is represented by blocks 518, 520, 522 and 524, each of which is formed by 12 rows by 12 columns consisting of 144 bits and contains information different from each other. When a signal pattern for recording information has a size of 18 rows of 18 pixels, one block containing 144-bit information has its size of 216 rows of 216 pixels.

When information is embedded in an A4 size sheet, for example, an A4 sized image of 300 dpi (dots per inch) has 2500 rows of 3500 pixels. The A4 sized sheet thus has 11 sets of 16 blocks, corresponding to 176 blocks, arranged thereon. With reference to FIG. 3, 256-bit information is embedded in four types of information blocks A, B, C and D, each of which are repetitive 44 times (176/4=44).

In order to read out the 256-bit information thus embedded in the A4 sheet in the ideal condition where it is not necessary to consider the letters, printing distortion, scanning distortion and stain on the document, it is sufficient to readout the information from the area corresponding to four of the blocks on the sheet.

Unfortunately, in the above methods, it is hard to fetch information on the historical record of, for example, the copy operator who copied the documents and the equipment and places on most of the routing paths. In order to have the information during the copying held in the printed materials as a historical record, it is required to update the embedded information during the copying by the copier. In the technologies disclosed by JP 2005-286963, Suzaki and JP 2005-269551, information is represented by visible dots, which are apt to be easily duplicated and the information embedded in an unreadable format is hard to update. Because, when the updated information is embedded in a copy, the dots holding the original information become an obstacle to forming a pattern representing the correct information on the print material.

In addition, copying slightly degrades a watermark pattern. It is thus hard to avoid the degradation through repeated copying. Furthermore, when printed materials are duplicated as magnified or reduced, watermarks are significantly degraded. In practice, therefore, the magnification/reduction during copying may be inhibited or the number of copies for enabling information to be read may be limited by the performance.

A technology is thus required by which a signal pattern printed in a printed document in an unreadable format may, when scanned, be erased from the scanned image and renewed information may be embedded thereinto.

SUMMARY OF THE INVENTION

It is therefore an object of the present invention to provide a device and a method for processing an image capable of updating information embedded in a printed document in an unreadable format.

In accordance with the present invention, an image processor for processing an image having information embedded therein and using a fine tint-block pattern as a watermark, comprises: a watermark detector that detects first information represented by the watermark from the image; an encoder that decodes and error-corrects the first information and re-encodes it into second information; and a watermark eraser that identifies the position of the tint-block pattern included in the watermark according to the second information and produces a watermark-erased image from which the watermark is erased. It is to be noted that the term "character" should broadly be interpreted throughout the patent application to cover the possibility of letter, numeral, mark and figure in addition to a character such as kanji character.

Thus, in the image processor in accordance with the present invention, the watermark detector detects first information represented by a watermark from the image, the encoder decodes and error-corrects the first information and re-encodes it into second information, and the watermark eraser identifies, according to the second information, the position of the tint-block pattern included in the watermark, and produces a watermark-erased image from which the watermark is erased. Therefore, even through repeated copying, information embedded in printed documents in an unreadable format may thus be updated, thereby suppressing the watermark degradation during the copying. When the printed materials are conveyed on an unauthorized route, the image processor may acquire the copy history from the printed materials, thereby identifying or specifying the detailed leakage path. The information leakage may thus be effectively suppressed.

Also in accordance with the present invention, a method for processing an image having information embedded therein and using a fine tint-block pattern as a watermark, comprises the steps of: detecting first information represented by the watermark from the image; decoding and error-correcting the first information and re-encoding it into second information; and identifying the position of the tint-block pattern included in the watermark according to the second information and producing a watermark-erased image from which the watermark is erased.

Thus, in the image processing method in accordance with the present invention, first information represented by a watermark is detected from the image, the first information is decoded, error-corrected, and re-encoded into second information, and the position of the tint-block pattern included in the watermark is identified according to the second information, and a watermark-erased image from which the watermark is erased is produced. Accordingly, even after repeated copying, information embedded in printed documents in an unreadable format may thus be updated, thereby suppressing the watermark degradation during the copying. When printed materials are passed on an unauthorized route, the image processing method may acquire the copy history from the printed materials, thereby identifying the detailed leakage path. The information leakage may thus be effectively suppressed.

BRIEF DESCRIPTION OF THE DRAWINGS

The objects and features of the present invention will become more apparent from consideration of the following detailed description taken in conjunction with the accompanying pictures in which:

FIG. 3 illustrates a conventional repeated pattern of watermark information embedded in a page;

FIG. 5 is a schematic block diagram of a configuration of the watermark detector shown in FIG. 4;

DESCRIPTION OF THE PREFERRED EMBODIMENTS

Figure 4:
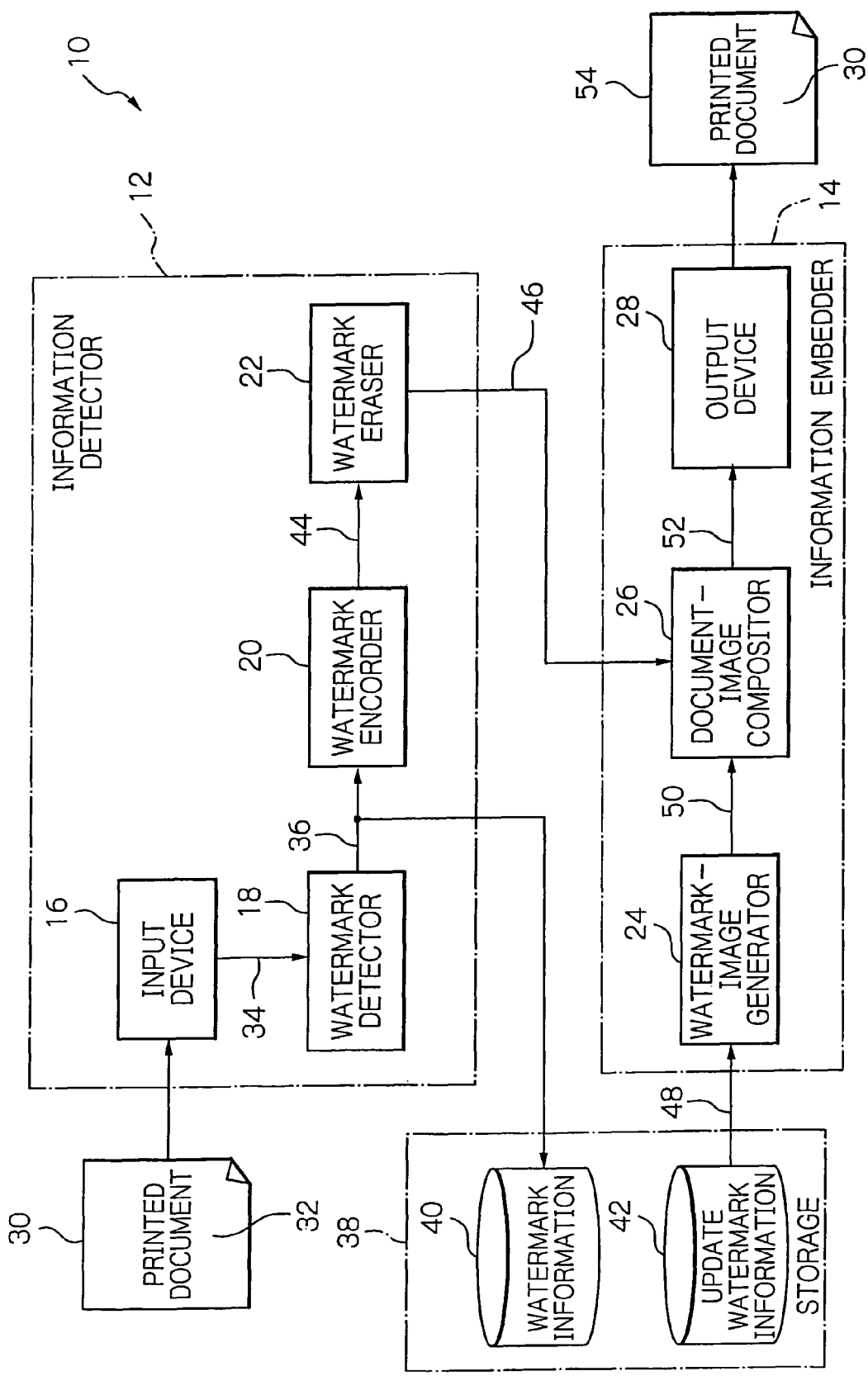
FIG. 4 is a schematic block diagram of a configuration of a watermark processing system including an image processor in accordance with an embodiment of the present invention.

With reference to the accompanying drawings, an image processor in accordance with illustrative embodiments of the present invention will be described in detail. With reference to FIG. 4, an image processor in accordance with an embodiment of the present invention includes a watermark detector 18 which detects, from an image signal 34, first information represented by a watermark, i.e. watermark information 36, which is in turn decoded and error-corrected by a watermark encoder 20, which re-encodes the resulting information into first information, i.e. generated encoded information 44, which is used by a watermark eraser 22 to identify the position of a tint-block pattern included in the watermark to produce a watermark-erased image 46 from which the watermark is erased. The information embedded in the printed documents in an unreadable format may thus be updated even after copied repetitively, thereby suppressing the watermark degradation during the copying. When the printed materials are conveyed on an unauthorized route as leaked, the image processor may acquire the copy history from the printed materials, thereby identifying the detailed leakage path. The information leak may thus be effectively suppressed.

In accordance with the specific illustrative embodiment of the present invention, the image processor is applied to a watermark processing system 10. Portions or components not directly relevant to understanding the present invention will neither be illustrated nor described merely for simplicity and clarity.

With reference to FIG. 4, the watermark processing system 10 generally includes an information detector 12 and an information embedder 14 which are interconnected as illustrated. The watermark processing system 10 processes a watermark including a fine tint-block pattern, such as an electronic watermark represented by a dot pattern.

The information detector 12 has a function of detecting the watermark information. The information detector 12 includes an input device 16, the watermark detector 18, the watermark encoder 20, and the watermark eraser 22 which are interconnected as illustrated. The information embedder 14 has a function of embedding watermark information into a print medium. The information embedder 14 includes a watermark image generator 24, a document image compositor 26, and an output device 28 which are interconnected as depicted.

Figure 1A:
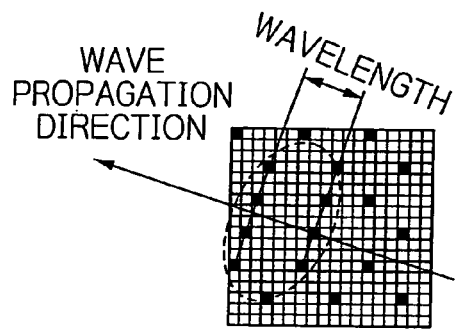
FIGS. 1A and 1B show conventional patterns for recording watermark information '1' and '0', respectively.
Figure 1B:
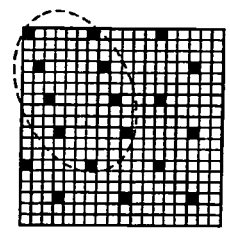
Figure 1C:
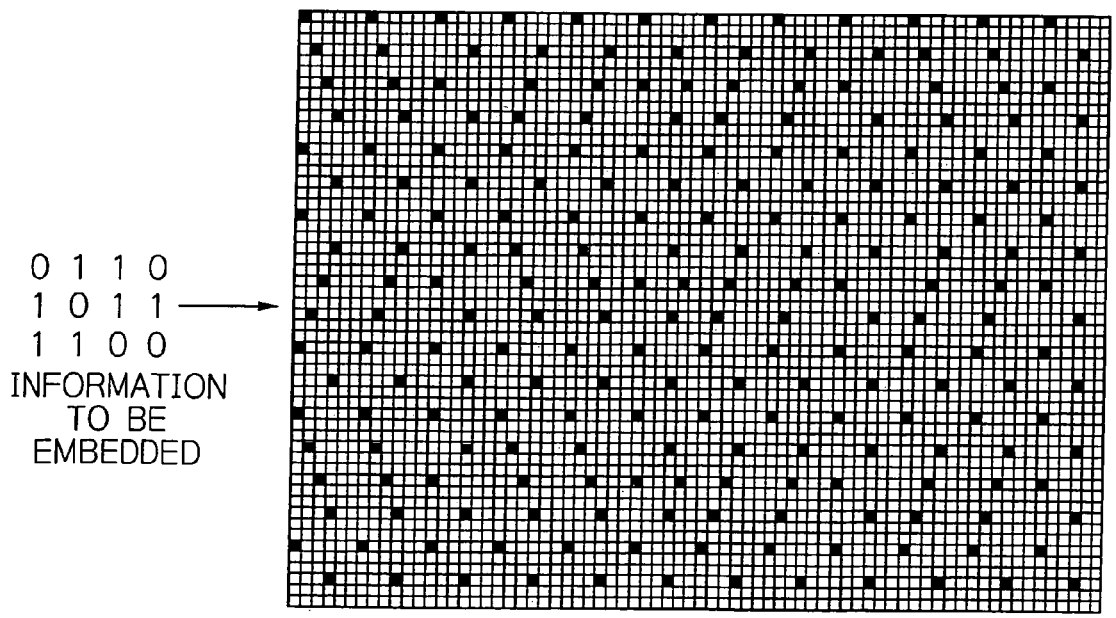
FIG. 1C shows a conventional pattern of an image having watermark information embedded therein.
Figure 2:
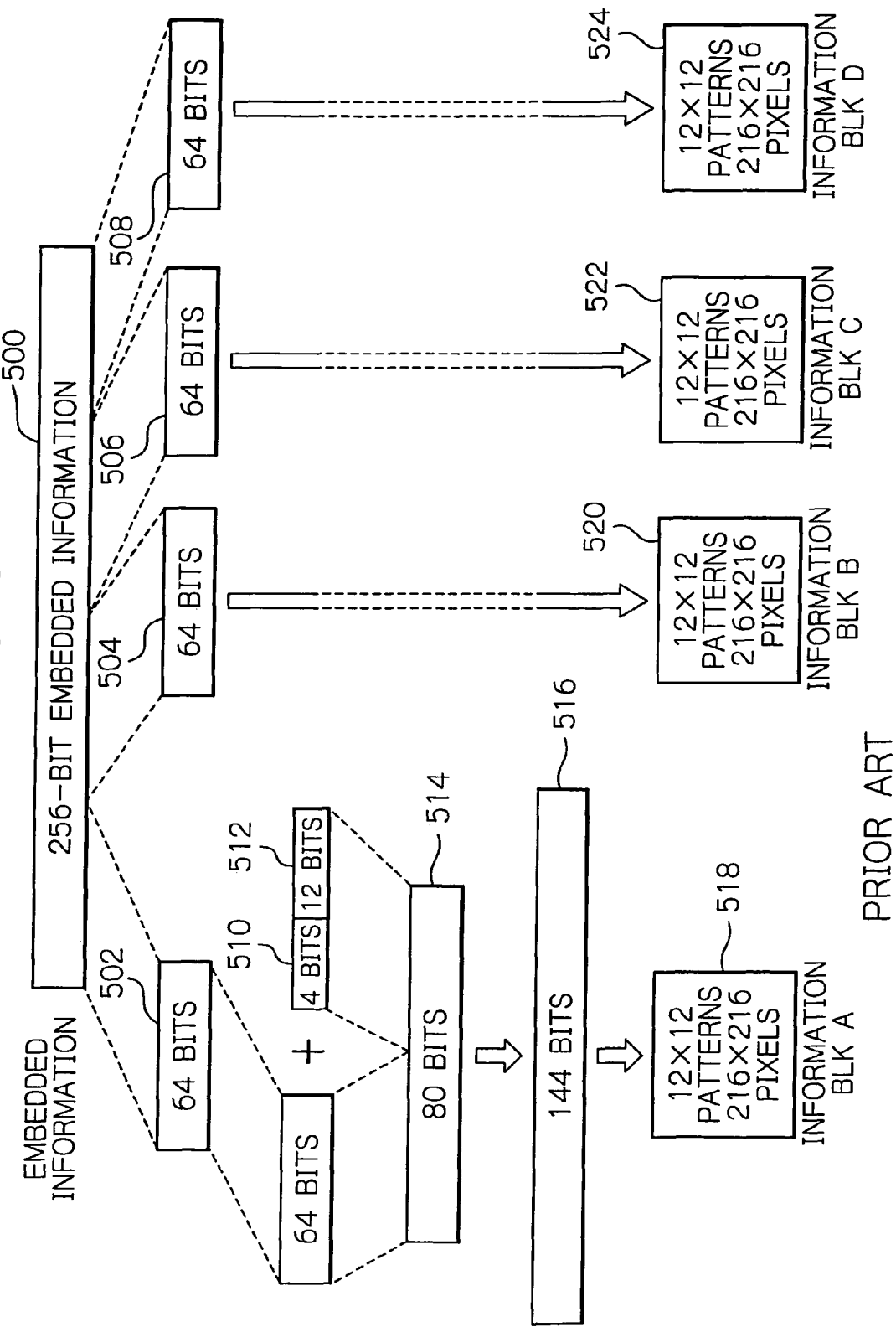
FIG. 2 shows a conventional structure of watermark information to be embedded.

Those constituent elements will be described in more detail below. The input device 16 has a function of reading out information from a printed document 32. The printed document 32 includes a print medium 30 having the watermark information embedded therein. The input device 16 also has a function of converting the read out information to a document image. The printed document 32 may carry imagewise information represented in a multi-level gray scale. The watermark embedded in the printed document 32 may be the same as shown in FIGS. 1A, 1B and 1C. The input device 16 may be a document scanner adapted to optically scan the print medium 30, thereby converting the printed document 32 to the form of electronic data. The input device 16 supplies the converted document image data or signal 34 to the watermark detector 18. Signals are designated with reference numerals of connections on which they are conveyed.

The input device 16 may be provided as an internal function of the watermark processing system 10. Alternatively, the input device 16 may be separately provided in the form of imaging device such as a camera or of input device such as an image scanner, which are provided outside the watermark processing system 10.

The watermark detector 18 has a function of detecting the position and rotation angle of a signal pattern on the input document image 34. The watermark detector 18 also has a function of decoding embedded information into the watermark information according to the detected position and rotation angle. The watermark detector 18 filters the input image signal 34 and thus detects the signal pattern embedded in the printed document 32. The watermark detector 18 uses the information included in the detected signal pattern to restore the embedded watermark information. The remaining constituent elements of the watermark detector 18 will be described later. The watermark detector 18 supplies the decoded watermark information 36 to the watermark encoder 20 and the storage 38.

The storage, or memory device, 38 includes a record area 40 for recording the watermark information and another record area 42 for recording watermark information to be updated. The watermark information 36 is stored in the record area 40.

The watermark encoder 20 has a function of encoding the supplied watermark information 36, thereby producing encoded information free from errors. The watermark encoder 20 supplies the encoded information 44 thus produced to the watermark eraser 22.

The watermark eraser 22 has a pattern-identification function, i.e. a function of identifying the position and the rotation angle of a signal pattern on the document image. The identification is performed according to the positional information derived by the watermark detector 18 and the information derived by the watermark encoder 20. The watermark eraser 22 also has a function of erasing the identified signal pattern. The watermark eraser 22 supplies the document image signal 46 having the identified signal pattern erased to the document image compositor 26.

The watermark image generator 24 has a function of receiving the update watermark information 48 from the storage 38 and thus generating or creating the watermark image. The watermark image generator 24 supplies the created watermark image 50 to the document compositor 26. The update watermark information 48 may be partially or completely different from the watermark information 36 already read out.

The document compositor 26 has a function of combining the input watermark image 50 with the document image 46 to form a resultant, watermark-included document image 52. The document image 46 is derived by erasing the watermark from the image derived by scanning the print medium 30. The document compositor 26 supplies the generated watermark-included document image 52 to the output device 28.

The output device 28 has a function of outputting the watermark-combined document image 52 in the form of printed document 30. The output device 28 prints out the document image 52 on the print medium 30 to thereby establish a printed document 54. The printed document 54 is physically stored and managed. The output device 28 may be an internal function of the watermark processing system 10 or an external printing device such as an electrophotographic printer.

The input device 16, the watermark detector 18, the watermark image generator 24, the document image compositor 26, and the output device 28 may be of the types known themselves as disclosed by JP Patent Laid-Open Publication No. 2006-253839.

With reference to FIG. 5, the watermark detector 18 includes a memory 56, a filter bank 58, a pattern identifier 60, and a rotation angle detector 62. The memory 56 is adapted to store in advance the types of signal pattern possibly embedded in the watermark-included document image 34. The filter bank 58 includes a plurality of types of filters, by means of which the watermark-included document image 34 is filtered out.

The signal pattern identifier 60 is adapted to identify the type of a signal pattern embedded in the watermark-included document image according to the results of the filtering processes. The rotation angle detector 62 functions as comparing the angular information indicated by the stored type of signal pattern with the angular information indicated by the identified type of signal pattern, thereby providing the rotational angle of the watermark-included document image.

Figure 6A:
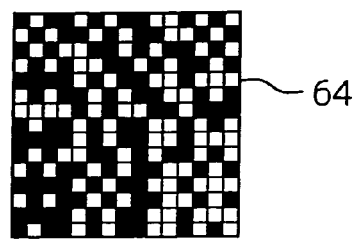
FIG. 6A shows bit rows of information processed in the watermark processing system shown in FIG. 4.

The function of the watermark image generator 24 will be described below. The watermark image generator 24 serves to digitize the update watermark information 48, i.e. convert the information 48 to corresponding digital values. The digital values are represented as shown in FIG. 6A in the form of bit rows of information 64. The watermark image generator 24 allocates each of the digital values thus converted, i.e. each bit of the bit rows 64, to a signal pattern consisting of a pattern of dots determined in advance to thereby form the watermark image 50.

Figure 6B:
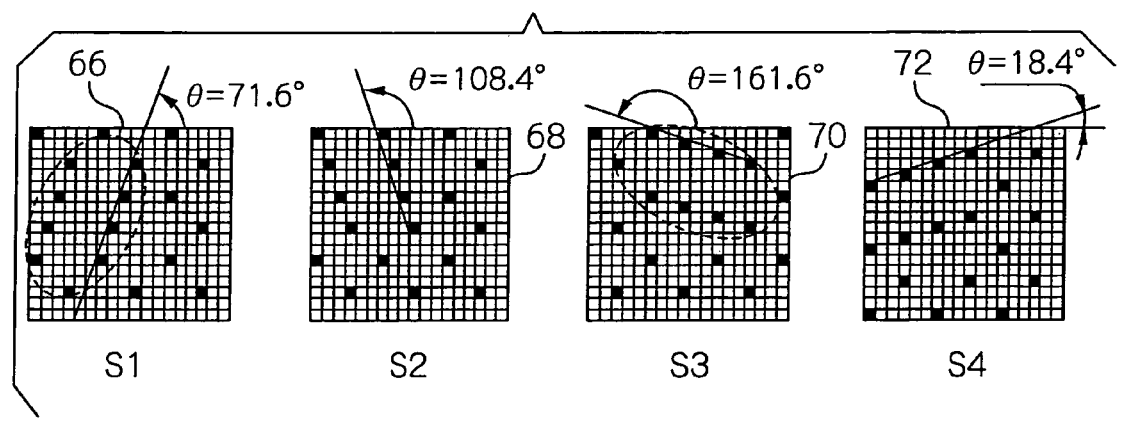
FIG. 6B shows signal patterns of information processed in the watermark processing system shown in FIG. 4.

When different types of signal pattern correspond to information on a one-to-one basis, a plurality of signal patterns S1 (66), S2 (68), S3 (70), and S4 (72), FIG. 6B, each include information on predetermined different angles as shown in FIG. 6B. Specifically, the signal patterns S1 (66), S2 (68), S3 (70), and S4 (72) store information '11' as an angle of 71.6°, information '10' as 108.4°, information '01' as 161.6°, and information '00' as 18.4°, respectively.

Figure 6C:
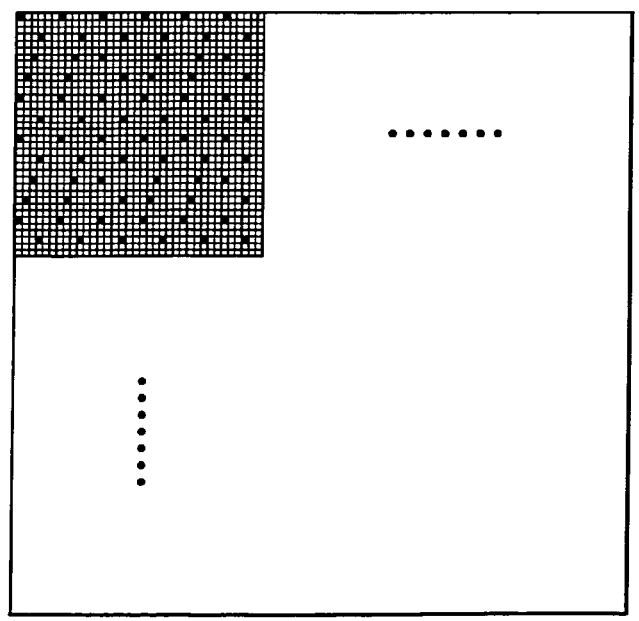
FIG. 6C shows information that is dot-patterned using a signal pattern processed in the watermark processing system shown in FIG. 4.

After converted to a dot pattern using the signal patterns, the watermark image 50 is represented as in FIG. 6C. The generated watermark image 50 includes at least one of the signal patterns S1 (66), S2 (68), S3 (70), and S4 (72) being disposed regularly.

The watermark processing system 10 is thus configured to generate and output the watermark-included document image 52. The watermark processing system 10 is advantageously implemented by a computer including a central processing unit (CPU), a read only memory (ROM), a random access memory (RAM), and an interface, as primary elements, not specifically shown. The ROM stores program sequences for executing the functions of the watermark processing system 10. The RAM corresponds to the memory 56 storing a plurality of signal patterns. The RAM is also used for temporarily storing the output data from the filters 58. The CPU uses the data stored in the RAM to execute the program sequences stored in the ROM and thus provides the functions executed in the respective functional blocks. Although the elements in accordance with the instant illustrative embodiment have been described referring to JP 2006-253839, the present invention is not specifically limited thereto.

A description will now be given of the operation of the watermark processing system 10 including an image processor in accordance with then embodiment. The embodiment is specifically featured by the watermark-information detection function, which will then mainly be described by focusing on the operations of the watermark detector 18, the watermark encoder 20, and the watermark eraser 22 of the information detector 12 of the watermark processing system 10. The watermark detector 18 identifies, during the information detection, the position and rotation angle for each signal pattern of the document image 34 and the first information of the signal pattern. The position for each signal pattern may be identified in a way similar to that disclosed by, e.g. U.S. Patent Application Publication No. US 2007/0005977 A1 to Tohne et al.

Figure 7:
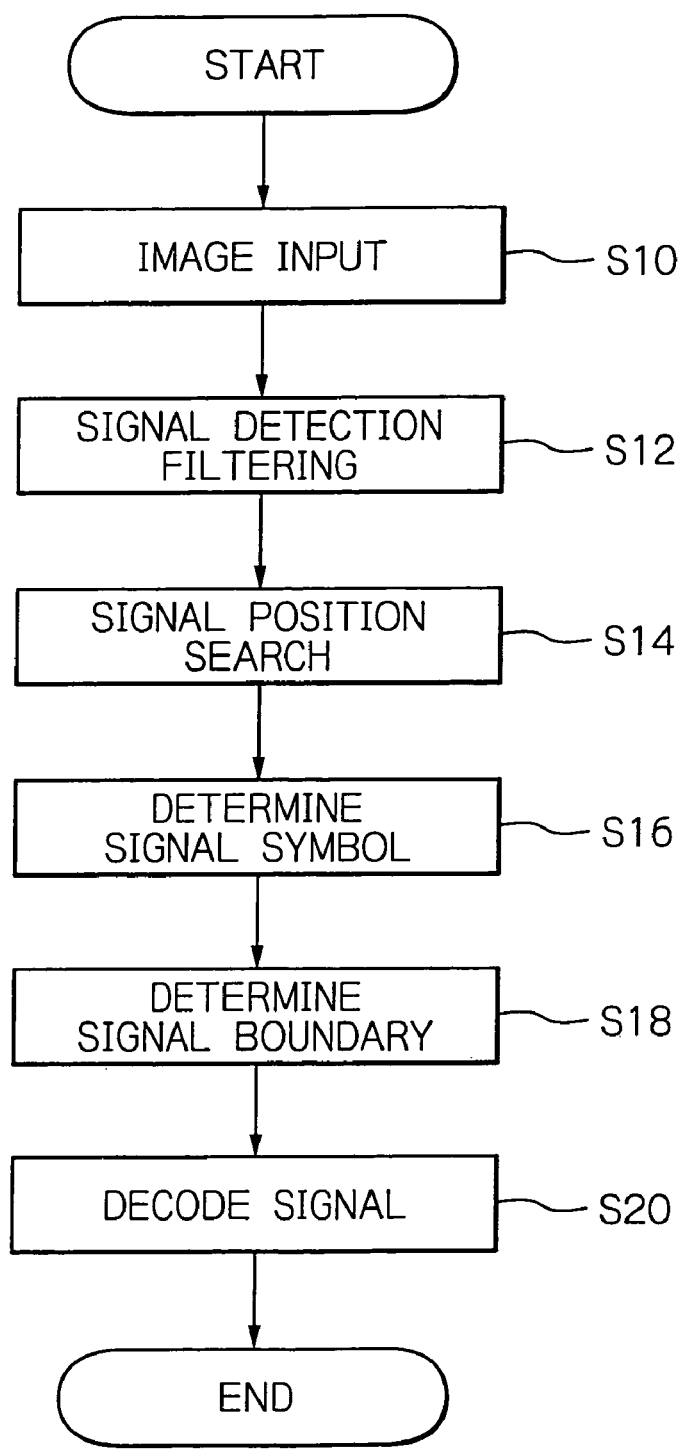
FIG. 7 is a flowchart useful for understanding an operational procedure in the watermark detector shown in FIG. 4.

With reference to FIG. 7, in step S10, the input device 16 receives a watermark-included document image, which is sometimes referred to as an input image. The input image is a multi-level gradation image as described earlier. The input image is a gray scale image represented in the 256 steps of gradation.

The watermark detector 18 filters the entire input image, and thus calculates the filter outputs and compares them (step S12). The filter outputs are calculated using a Gabor filter to perform a convolution between the filters and the image for the whole pixels of the input image 34. The Gabor filter is represented by $$G(x, y) = \exp\left[-\pi\left\{\frac{(x-x0)^2}{A^2} + \frac{(y-y0)^2}{B^2}\right\}\right] \times \exp\left[-2\pi i\left\{\frac{u(x-x0) + v(y-y0)}{}\right\}\right] \quad (1)$$

where G (x, y) is the Gabor filter function and i is an imaginary number unit. The variable x ranges from 0 to gw−1 and y ranges from 0 to gh−1. The variables x0 and y0 are defined as x0=gw/2 and y0=gh/2, respectively. The variables gw and gh are the sizes of the filter. The values A and B represent the effective ranges in the horizontal and vertical directions, respectively. The direction of the wave is represented by $\tan^{-1}$ (u/v) and the frequency of the wave is represented by $(u^2+v^2)^{1/2}$.

The filter output at any position in the input image is calculated by the convolution between the filter and the image. The Gabor filter includes a real number filter and an imaginary number filter. The square average of the two filter outputs is defined as the filter output. The imaginary number filter is shifted in phase by half a wavelength from the real number filter.

The filter output F (A, x, y) is represented by $$F(A,x,y) = \sqrt{Rc^2 + Ic^2} \quad (2)$$

where the function F (A, x, y) is an output of the filter A at a pixel (x, y), the value Rc is a convolution between the brightness at a pixel (x, y) and the real number filter, and the value Ic a convolution between the brightness at a pixel (x, y) and the imaginary number filter.

Figure 8:
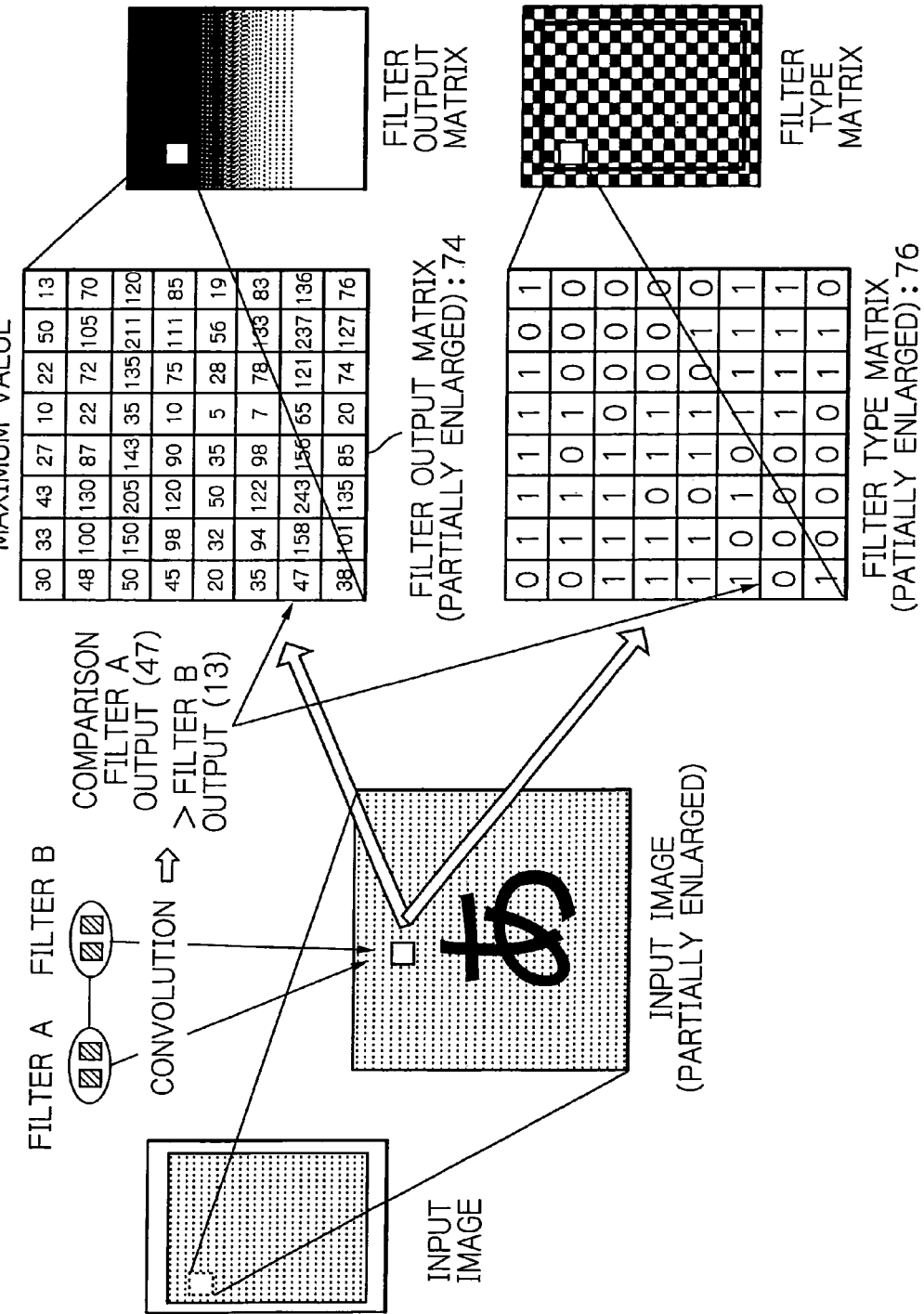
FIG. 8 illustrates an operational procedure for the signal detection filtering shown in FIG. 7.

After the filter outputs are calculated for all of the filters that correspond to the respective signal units, the watermark detector 18 compares the filter outputs calculated at the respective pixels as shown in FIG. 8. The watermark detector 18 stores the maximum filter output F (x, y) in the memory 56 as a filter-output matrix 74. The watermark detector 18 also stores the number of the signal unit corresponding to the filter having the maximum filter output as a filter-type matrix 76, as shown in the figure.

Specifically, when the filters A and B are compared at a pixel (x, y) resulting in F (A, x, y)>F (B, x, y), F (A, x, y) is set as the value at the pixel (x, y) of the filter-output matrix and the number "0" of the pixel (x, y) of the filter-type matrix is set as the value representing the signal unit A. In this embodiment, the signal units A and B correspond to the filters A and B, respectively. The signal units A and B are therefore represented by the numbers "0" and "1" of the filters A and B, respectively.

Although the instant embodiment includes the two filters, more filters may also be used. A similar function may then be provided by comparing the maximum filter outputs of the filter-output matrices 74 and storing the number of the signal unit corresponding to the filter having the maximum filter output as the filter-type matrix 76.

Figure 9:
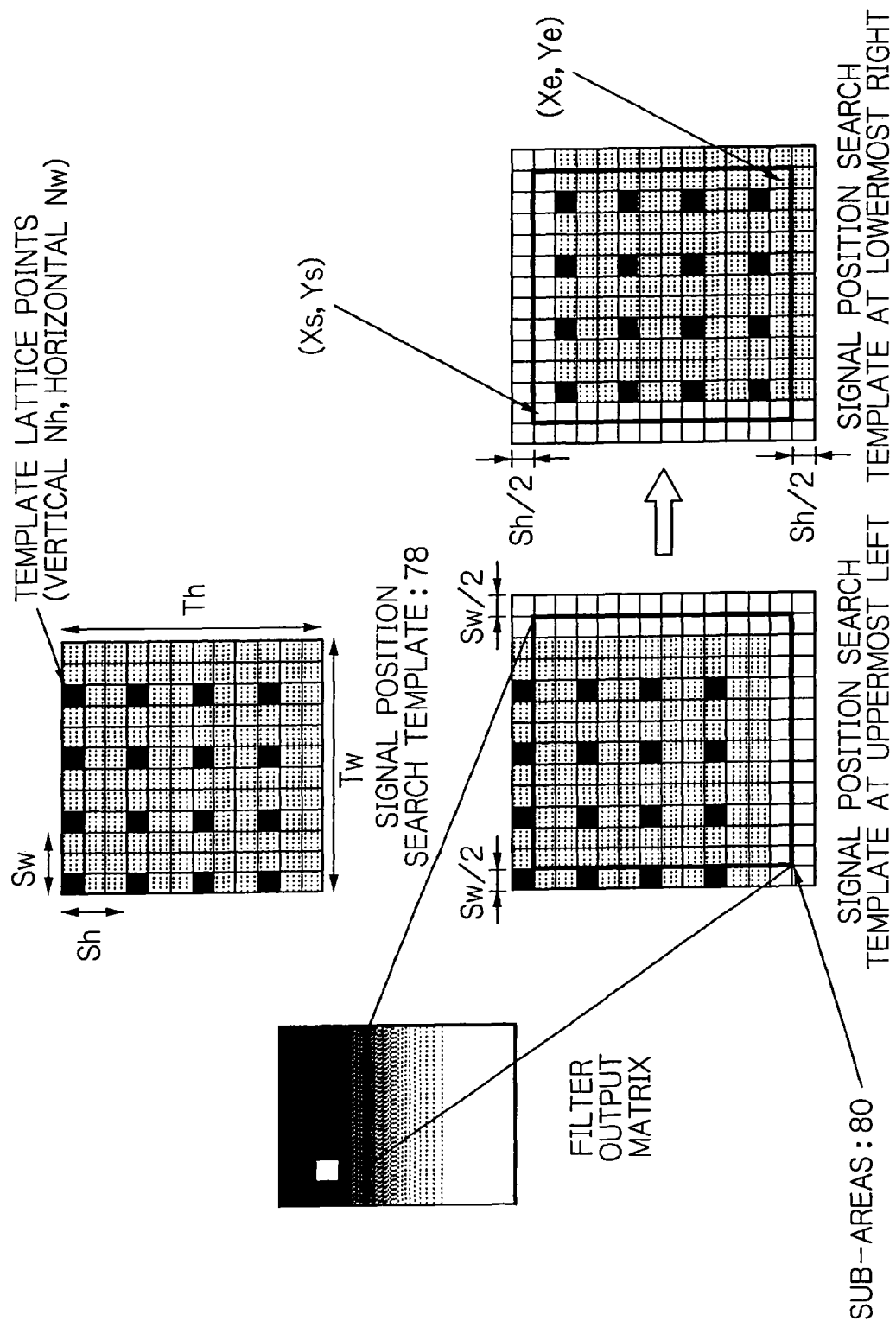
FIG. 9 illustrates an operational procedure for the signal position search shown in FIG. 7.

Returning to FIG. 7, at step S14, the signal position is then searched. The search uses the derived filter-output matrix 74 to determine the position of the signal unit. Specifically, when the signal unit has a size of Sh×Sw, a signal position search template 78 is generated that has a vertical interval Sh and a horizontal interval Sw of the lattice points, and the number of lattice points Nh×Nw, as shown in FIG. 9. The generated template 78 has a size of Th (Sh*Nh)×Tw (Sw*Nw). The number Nh in the vertical direction and the number Nw in the horizontal direction may each be any value suitable to search the signal-unit position.

The filter-output matrix 74 is divided into sub-areas, each sub-area having the size of the template 78. With reference to FIG. 9, in each sub-area 80, in the range not to overlap the signal units of the adjacent areas, i.e. in the range of ±Sw/2 in the horizontal direction and in the range of ±Sh/2 in the vertical direction, the template 78 is moved on the filter-output matrix 74 in pixel units, while the total V of F (x, y) in the filter-output matrix on the lattice points of the template 78 is determined using Expression:

$$V(x, y) = \sum_{u=0}^{Nw-1} \sum_{v=0}^{Nh-1} F(x + Sw*u, y + Sh*v) \quad (3)$$

where the variable x ranges as Xs−Sw/2<x<Xe+Sw/2 and the variable y ranges as Ys−Sh/2<y<Ye+Sh/2. The coordinates (Xs,Ys) indicate the point in the upper left of the sub-area 80. The coordinates (Xe, Ye) indicate the point in the lower right of the sub-area 80. The watermark detector 18 sets the lattice point of the template 78 having the largest sum at the position of the signal unit in the area.

This example corresponds to the case where the filtering during the signal detection provides the filter outputs for every pixel. During the filtering, only the pixels spaced at a constant interval may be filtered. When, for example, only every two pixels are filtered, the lattice point interval of the signal position search template 78 may be reduced to ½.

Returning again to FIG. 7, at step S16, the signal symbol is then determined. The watermark detector 18 references the value of the filter-type matrix 74 at the determined signal-unit position, i.e. the signal-unit number corresponding to the filter, in order to determine whether the signal unit is A or B. In this way, the determination results of the determined signal unit are stored in the form of symbol matrix.

The signal boundary is then determined (step S18). The watermark detector 18 filters the whole image regardless of whether or not the signal unit is embedded. It is thus needed to determine what signal unit is embedded in which part of the image. The watermark detector 18 thus searches, from the symbol matrix, for a pattern determined in advance when the signal unit is embedded, thereby determining the signal boundary.

Figure 10:
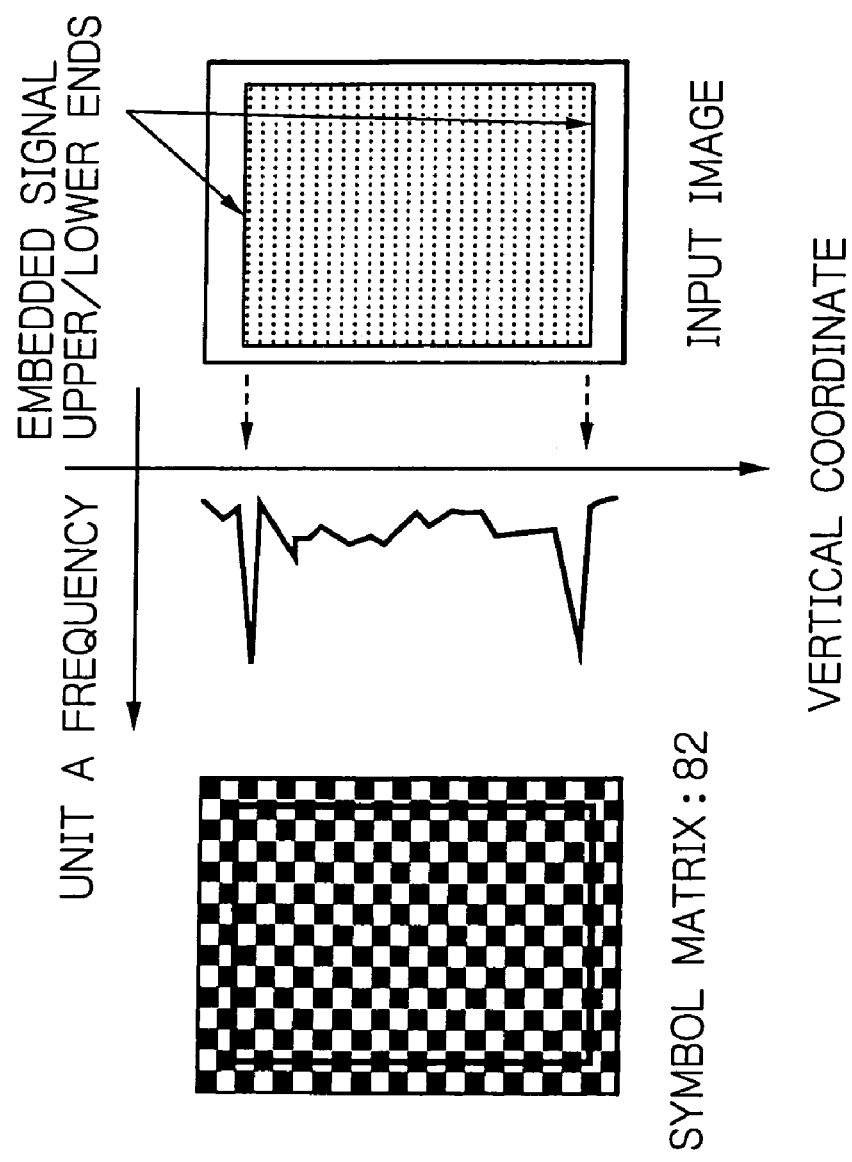
FIG. 10 shows a relationship between an input image histogram and a symbol matrix in the signal boundary determination shown in FIG. 7.

When, for example, the signal unit A is to be embedded in the boundary where the signal unit is embedded, the number of signal units A is counted in the lateral direction of the symbol matrix that is determined at the step where the signal symbol is determined. After counting, in the upward and downward directions from the center, the positions having the largest number of signal units A are set to the upper/lower ends of the signal boundary, respectively. As shown in FIG. 10, the signal unit A in the symbol matrix 82 is represented as "black" i.e. level "0". The number of black pixels in the symbol matrix 82 may thus be counted to thereby count the number of signal units A. This frequency distribution may provide the upper/lower ends of the signal boundary. The left/right ends may also be determined in a similar way including counting the number of units A in different directions. The signal boundary may also be determined by other methods such as only determining in advance the pattern that may be searched for from the symbol matrix 82 on the embedding side and the detection side.

Returning again to FIG. 7, at step S20, the watermark detector 18 restores the original information from the portion of the symbol matrix 82 that corresponds to the inside of the signal boundary. In this embodiment, a single unit pattern includes a single symbol unit, so that a unit pattern matrix is equivalent to the symbol matrix.

Figure 11:
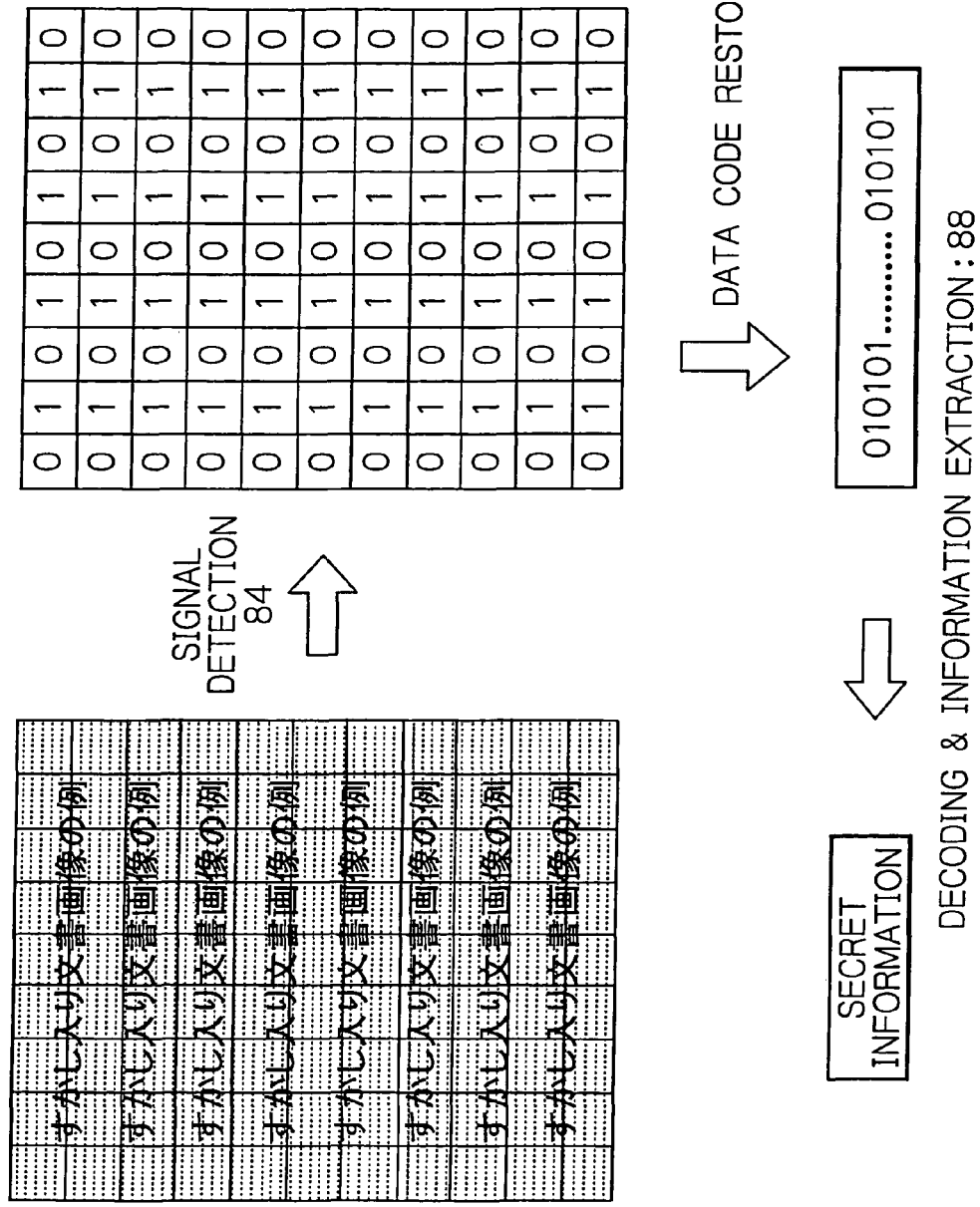
FIG. 11 illustrates a procedure for the information restoration shown in FIG. 7.
Figure 13:
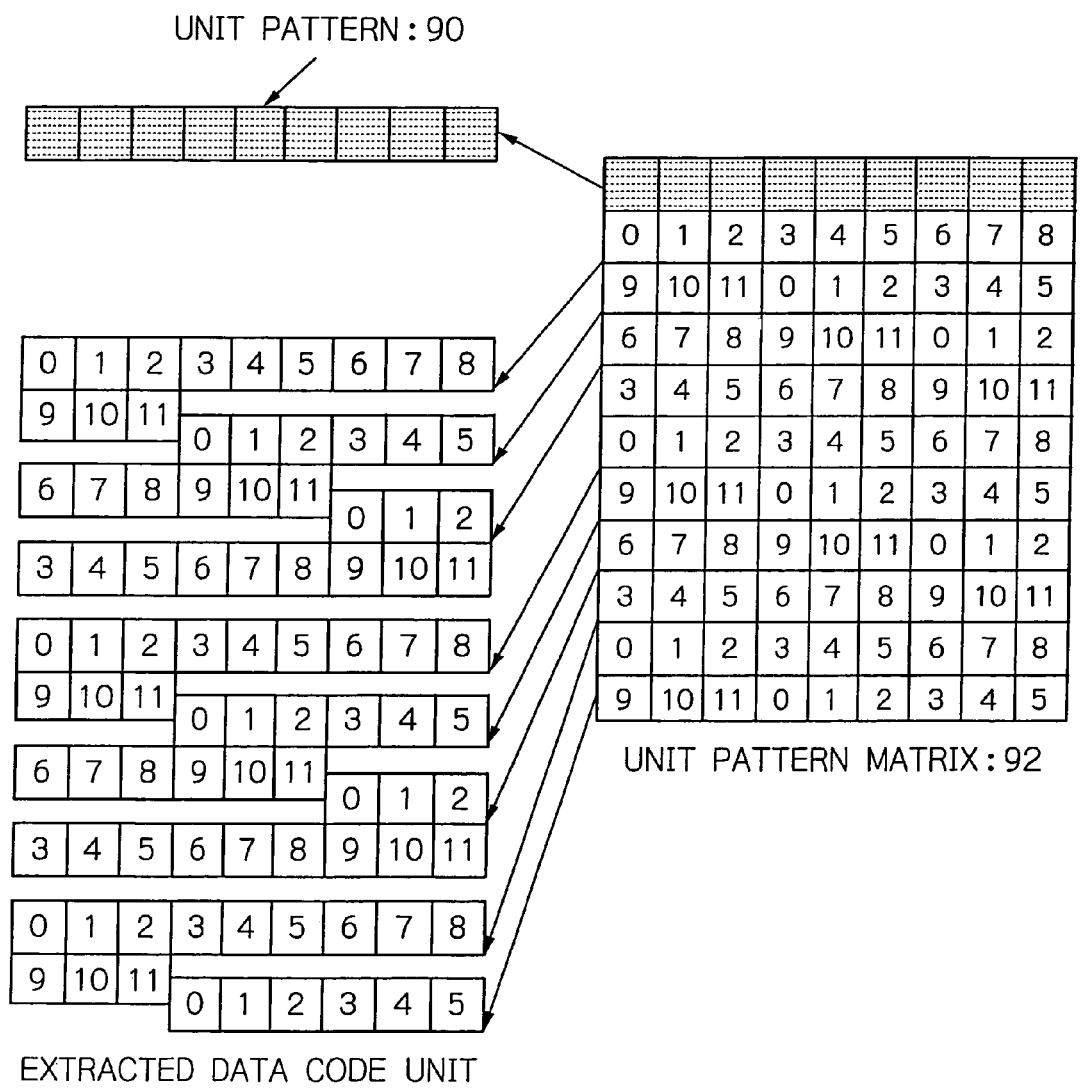
FIG. 13 illustrates extraction of a data code unit in the data code extraction step shown in FIG. 12.

With reference to FIG. 11, information is generally decoded using three procedures. First, the symbol embedded in each unit pattern is detected (symbol detection 84). With reference to FIG. 13, a unit pattern 90 includes a single symbol unit as described above and is extracted as a bit row representing a code length.

Secondly, the symbols are coupled to restore the data code (restoration 86, FIG. 11). Thirdly, the data code is decoded and the embedded information is extracted (decoding and information extraction 88). The encoding and the embedding are basically performed in the way opposite to those shown in FIG. 11.

Figure 12:
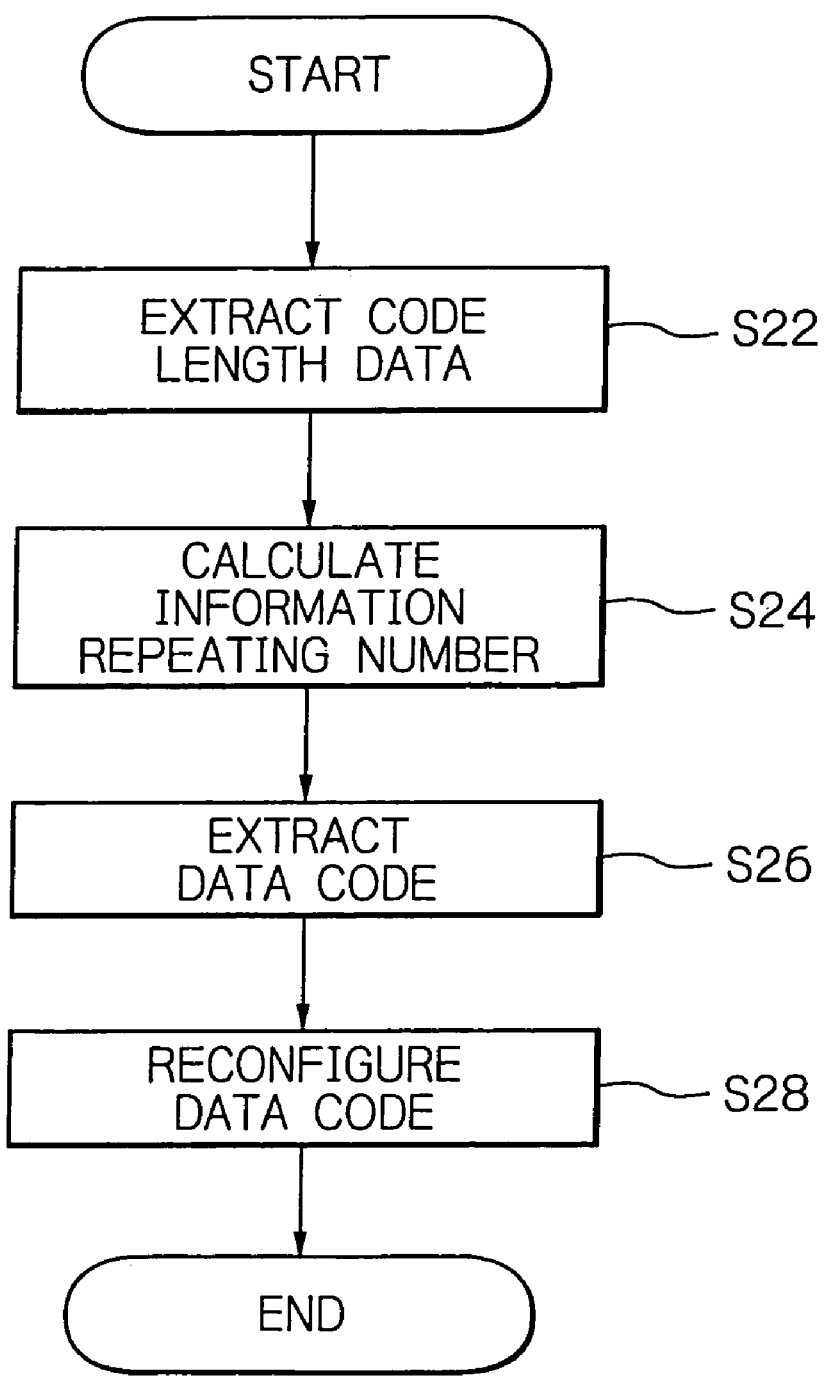
FIG. 12 is a flowchart useful for understanding an operational procedure in the watermark encoder shown in FIG. 4.

With reference to FIGS. 12 and 13, the procedure for the information restoration will be described below. With reference to FIG. 13, the watermark detector 18 extracts the code-length data portion from the first row of the unit pattern matrix, thereby obtaining the code length of the embedded data code (step S22, FIG. 12).

The watermark detector 18 then uses the size of the unit pattern matrix 92 and the obtained code length of the data code to calculate the number of times Dn where the data code unit is embedded and the residue Rn (step S24). For the example shown in FIG. 13, the watermark detector 18 divides the unit pattern matrix 92 into subgroups from U (2, 1), which means the second row and the first column. Each subgroup includes twelve pattern units. Specifically, the subgroups include the pattern units U (2, 1) to U (3, 3) and U (3, 4) to U (4, 6), . . . , respectively. With the 12 pattern units used as one unit, the data code unit Dn is extracted seven times, resulting in the data code unit Dn=7. The residue Rn corresponds to the upper six pattern units in the data code unit, resulting in the residue Rn=6. As the residue Rn, the pattern units U (11, 4) to U (11, 9) are extracted.

The watermark detector 18 then extracts the data code unit from the second row or more of the unit pattern matrix in the way opposite to that in the data code extraction (step S26).

Figure 14:
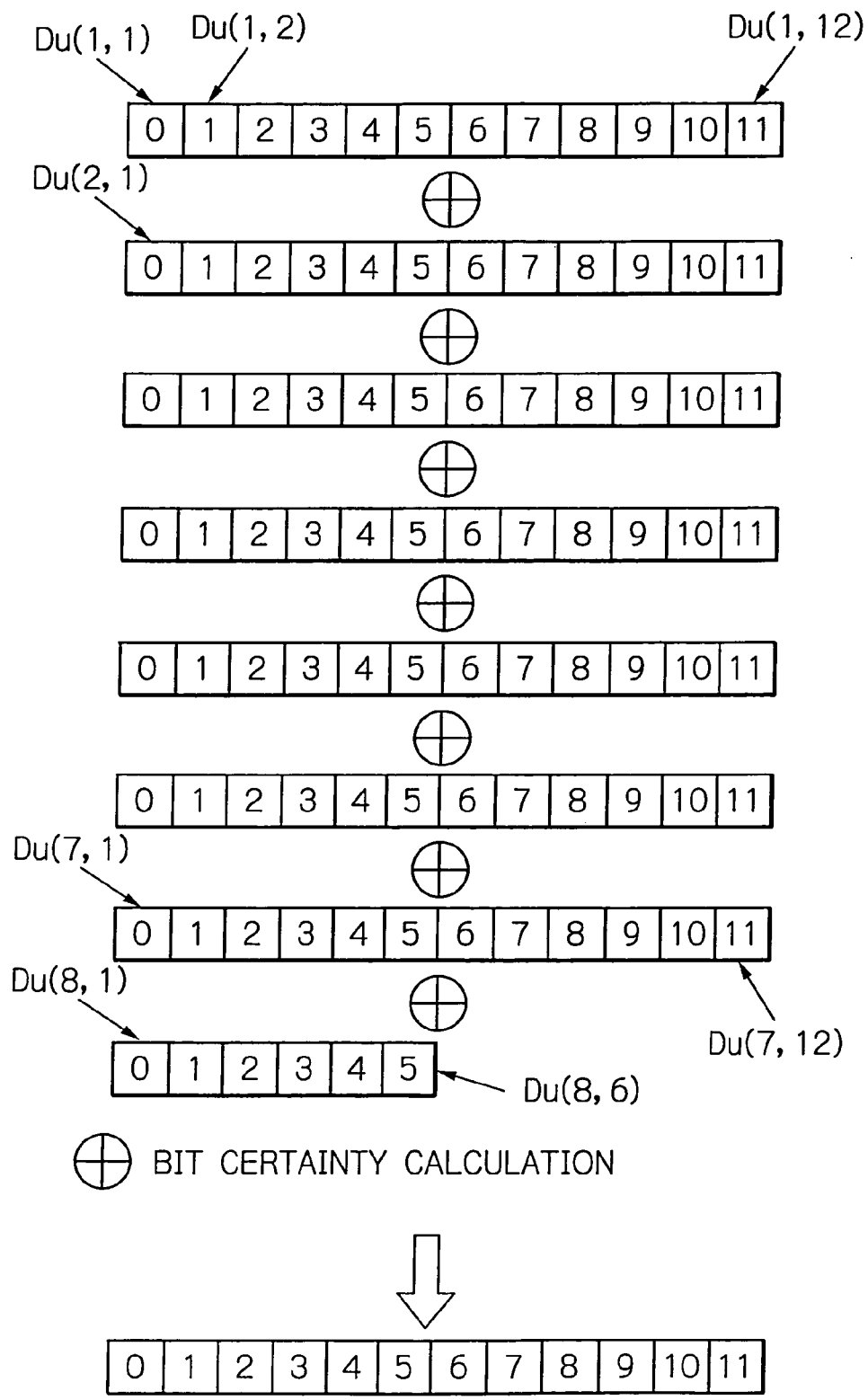
FIG. 14 illustrates certainty operation in the data code reconfiguration shown in FIG. 12 and operational results.

With reference to FIG. 14, the data code units extracted from the first row and the first column of the unit pattern matrix 92 are set to Du (1, 1) to Du (1, 12). The data code units are sequentially denoted as Du (2, 1) to Du (2, 12), . . . , . The residue portions are Du (8, 1) to Du (8, 6).

The bit certainty is then calculated for the extracted data code units, thereby reconfiguring the embedded data codes (step S28).

The bit certainty is calculated by, for example, determining each symbol value of the data code on majority rule for the elements of each data code unit. This may restore the data code correctly even when the overlapping with the character area or a stain on a page causes a bit-inversion error and so the signal is not correctly detected from any unit in any data code unit.

Specifically, the first bit of the data code, for example, is determined as binary "1" when more of the signal detection results of Du (1, 1), Du (1, 2), . . . , and Du (1, 8) show "1". When more of the signal detection results show binary "0", the first bit is determined as "0". Likewise, the second bit of the data code is determined by the signal detection results of Du (2, 1), Du (2, 2), . . . , and Du (2, 8) on majority rule. The twelfth bit of the data code is determined by the signal detection results of Du (12, 1), Du (12, 2), . . . , and Du (12, 7) on majority rule. This is because Du (12, 8) does not exist.

Although, in this embodiment, the data code is repeatedly embedded, the data code unit may not be repeated using the error correction code or the like when the data is encoded.

The information of the resulting signal pattern, i.e. the first information may be wrong because it is not correctly detected due to the interference with the characters in the document image. Against errors, however, the measures are provided of encoding the data using the error correction code when the data is embedded. The appropriate decoding may then remove errors from the first information to generate decoded information.

The watermark encode will now be described below. The watermark encoder 20 re-encodes the error-free decoded information decoded by the watermark detector 18 in the way opposite to that in the decoding. The error-free encoded information may be referred to as second information. The watermark encoder 20 produces the second information. The watermark encoder 20 also updates the errable first information allocated to each signal pattern on the document image 34 to the error-free, second information. The second information correctly indicates the signal patterns even when the signal patterns and the characters are not correctly detected due to the interferences. Using the second information for each signal pattern, the second type that correctly indicates the type of the signal pattern is determined according to the relationships in FIGS. 6A, 6B, and 6C.

The watermark eraser 22 will now be described below. The watermark eraser 22 uses the position and the rotation angle of the resulting signal pattern unit on the document image 34 and the second type indicated by the resulting signal pattern, in order to estimate the dot positions included in the watermark for each signal pattern unit. In JP 2006-253839 described earlier, the watermark eraser 22 may use the reading resolution of 400 dpi for the printing resolution of 600 dpi. In the present illustrative embodiment, it is preferable to scan the image with the resolution as high as possible in order to minimize the degradation of the image quality during the copying.

In order to reduce the processing amount, the watermarks may be detected at a lower resolution. Even in this case, the watermark detector 18 and the watermark encoder 20 process data at a lower resolution, and the watermark eraser 22 scales the signal pattern position information by the resolution difference, thereby identifying the signal pattern positions at a high resolution and estimating the dot positions for each signal pattern unit.

With the most upper-left point of the document image being set to the origin (0, 0), the dot positions of the signal pattern S1 recording digital information "11" include the following 18 points when no rotation is applied: $(x_n, y_n)$=(0, 0), (0, 6), (0, 12), (3, 3), (3, 9), (3, 15), (6, 2), (6, 8), (6, 12), (9, 1), (9, 7), (9, 15), (12, 0), (12, 6), (12, 12), (15, 3), (15, 9) and (15, 15), where the subscript n=1, 2, . . . , 18.

When a document image from which the watermark is to be erased is scaled, the scaling factor is set to $\alpha$, the upper-left position of the signal pattern on the document image is set to (Px, Py), and the rotation angle of the signal pattern is set to $\theta_p$, the positions of the dots included in the signal pattern may be estimated as coordinates $(Ex_n, Ey_n)$ from $$\begin{pmatrix} Ex_n \\ Ey_n \end{pmatrix} = \alpha \begin{pmatrix} \cos\theta_P & \sin\theta_P \\ -\sin\theta_P & \cos\theta_P \end{pmatrix} \begin{pmatrix} x_n \\ y_n \end{pmatrix} + \begin{pmatrix} Px \\ Py \end{pmatrix} \quad (4)$$

Figure 15:
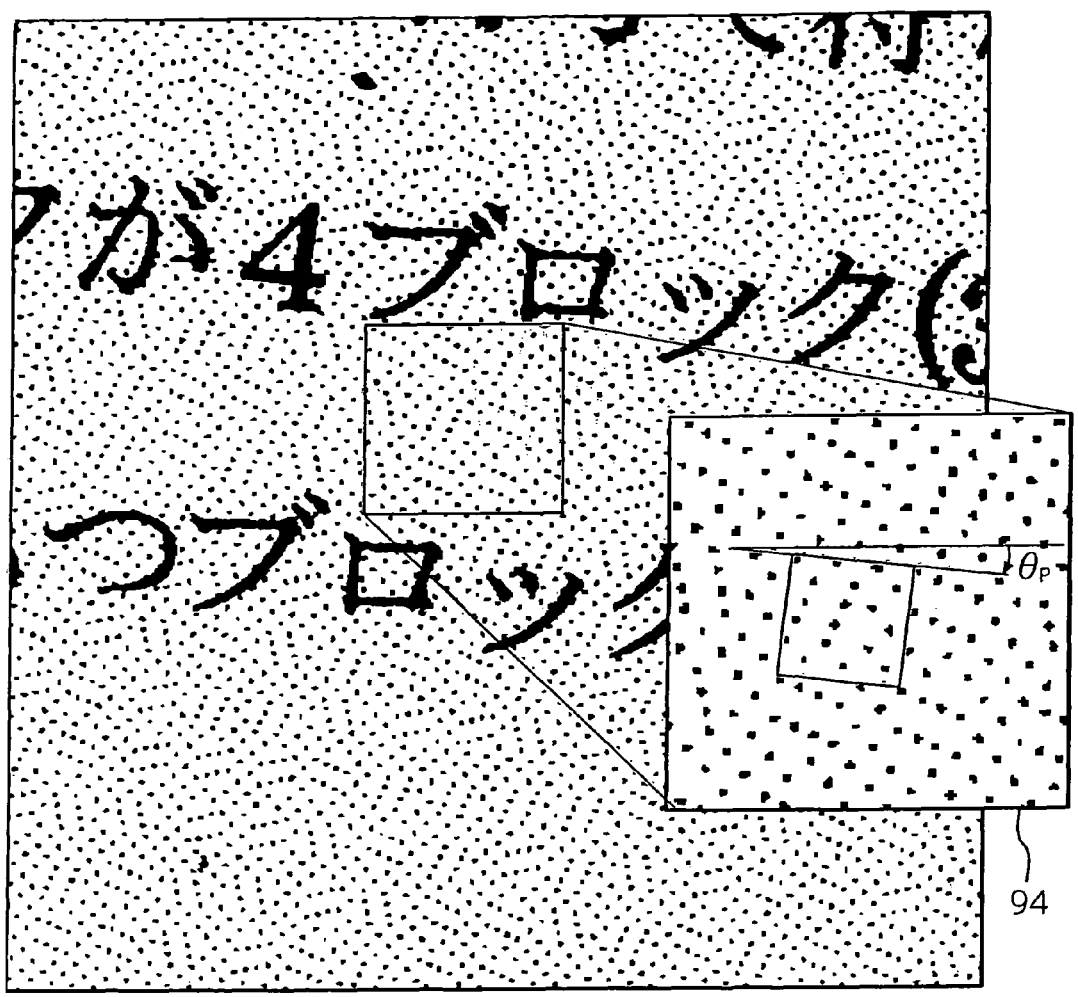
FIG. 15 shows an example of a signal pattern including an inclined input image in the watermark processing system shown in FIG. 4.
Figure 16:
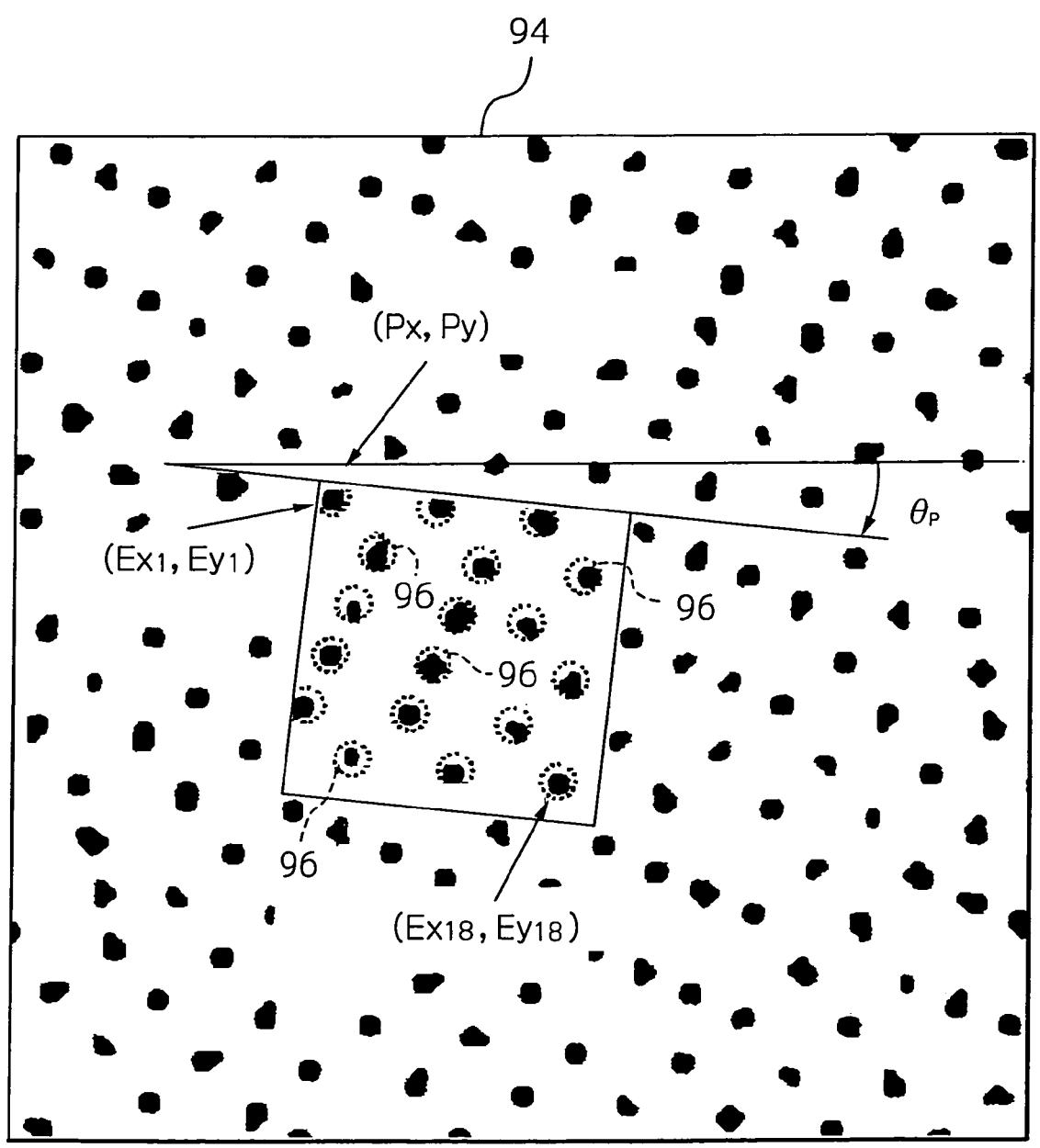
FIG. 16 is an enlarged view of the substantial portion of the input image shown in FIG. 15.

FIGS. 15 and 16 show the resulting estimated dot positions. In the signal pattern S1 around the center of the enlarged area 94 shown in FIG. 15, the dot positions calculated using Expression (4) are denoted by respective dotted circles 96 shown in FIG. 16. Although the dot shapes are deformed during the printing on the page and scanning the page, the dot positions are generally the same.

When printed at 600 dpi, the signal pattern shown by 18 rows of 18 dots has a small size of about 0.7 mm. When a corrugation, a twist, or the like of the sheet causes the dot positions to shift, the relative position within 0.7 mm of the signal pattern changes little. Each signal pattern may be identified within the shift of about a few dots by searching for the peak positions of the Gabor filter output and estimating a position from the surrounding signal pattern position. The shift of a few dots may be absorbed by detecting the signal pattern position by a template-matching method using the template of the signal pattern rotated by $\theta_p$. This process may be used to estimate the positions of all dots included in the watermark for all signal patterns.

With reference to FIG. 16, the dot pattern included in the watermark is slightly shifted and deformed during the printing on the page and scanning the page. In order to absorb the slight shift and deformation, isolated points are searched for and the points searched for are set to the dots.

The watermark eraser 22 searches for isolated points corresponding to respective dot units of all signal patterns. When hundred signal patterns are used for example, the watermark eraser 22 searches for 1800 isolated points. When the search finds out the corresponding isolated points, the watermark eraser 22 erases the corresponding isolated points.

The isolated points are searched for and erased by, for example, repeating four steps. The first step is to set a group of pixels coupled in one of the four vicinities to one isolated point, each group having 10 or less black pixels. The second step is to search for an isolated point that has the distance of three or fewer pixels between the centroid of that isolated point and the position of a dot. The third step is to determine, when a plurality of isolated points exist, the isolated point having the shortest distance as the dot of the signal pattern, and erase the determined dot. The fourth step is to erase, when no isolated point exists, no pixels.

Figure 17:
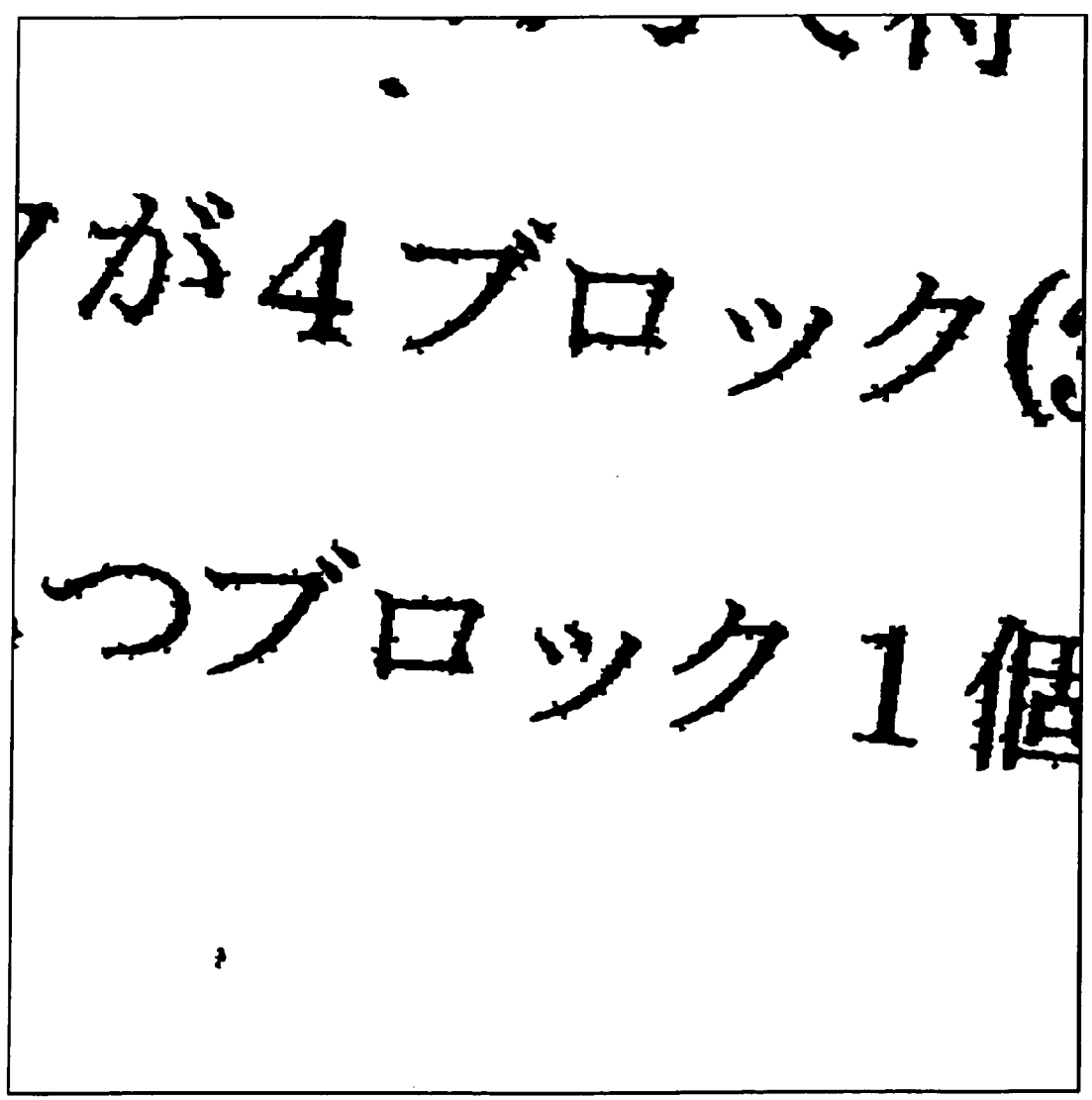
FIG. 17 shows an input image with the watermark signal pattern erased by the watermark eraser shown in FIG. 4.

FIG. 17 shows the resulting image with the dots of all signal patterns of the watermark erased. When it is impossible to erase the dots coupled with the characters, the dots are finally combined with a watermark image having new information, resulting in no disadvantage. It is possible, however, to erase the dots because the dot positions are identified.

Figure 18A:
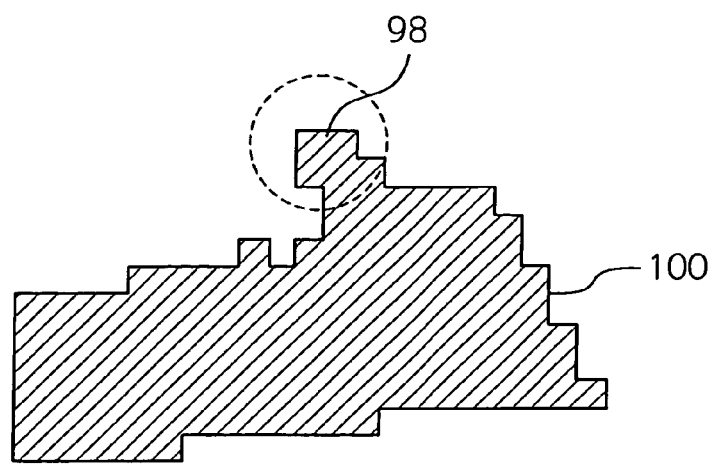
FIG. 18A shows a relationship between a character and a watermark dot in contact therewith dealt with in the watermark eraser shown in FIG. 4.
Figure 18B:
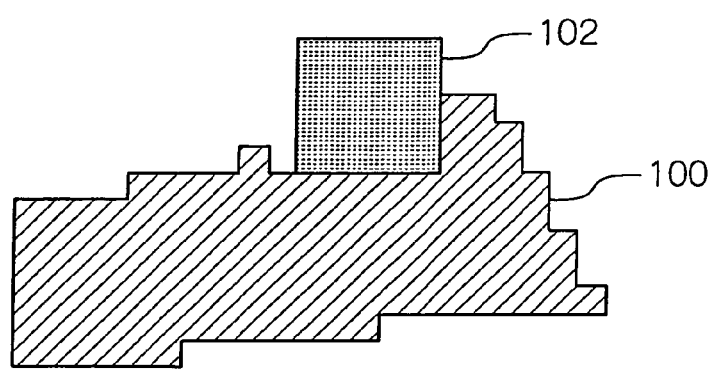
FIG. 18B shows a relationship between a character and a dot-erasure mask dealt with in the watermark eraser shown in FIG. 4.
Figure 18C:
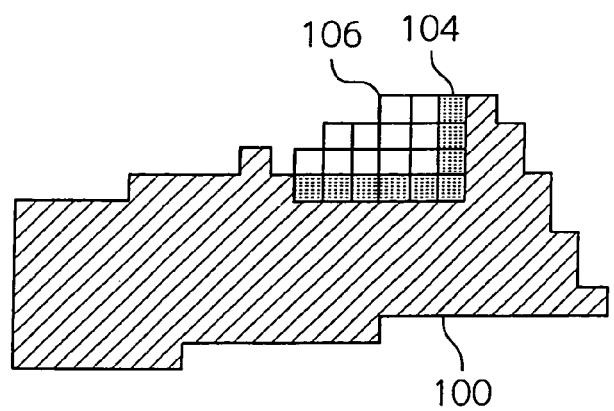
FIG. 18C shows a relationship between a character and a restored-character portion dealt with in the watermark eraser shown in FIG. 4.

With reference to FIGS. 18A, 18B and 18C, for example, the dot erasure by the watermark eraser 22 will be described. In FIG. 18A, the dot 98 of the watermark surrounded by a dotted circle is coupled to a hatched character portion 100. With reference to FIG. 18B, the watermark eraser 22 masks a rectangular area that has about the same area as the adjacent dot, such as a rectangular area 102 of 5 rows of 5 pixels, and erases the dots in the area 102.

With reference to FIG. 18C, the watermark eraser 22 also couples the black pixels in the vicinity of the rectangular area, i.e. black pixels 104 adjacent to the dot erasure mask (rectangular area 102), using straight lines. The watermark eraser 22 thus restores a character portion 106 and restores the outline of the character. It is also possible to prevent the loss of the dot completely overlapped with the character, the loss leaving a white patch. Likewise, when erasing the dot on a color document, a color is estimated from a portion in the vicinity of the dot, thereby restoring the background color after the dot is erased. For example, the pixels in the vicinity of the dot may be connected using a straight line while the colors of the pixels are linearly changed.

Thus, the operations in this embodiment have been described by focusing on the watermark detector 18, the watermark encoder 20, and the watermark eraser 22, which are the functional portions working as the watermark-information detection function of the watermark processing system 10. The operations of the information embedder 14 of the watermark processing system 10 will now be described below.

The watermark image generator 24 generates the watermark image 50 from new embedded information such as the update watermark information 48. The update watermark information 48 may be partially or completely different from the watermark information 36 read out by the watermark detector 18.

Figure 19:
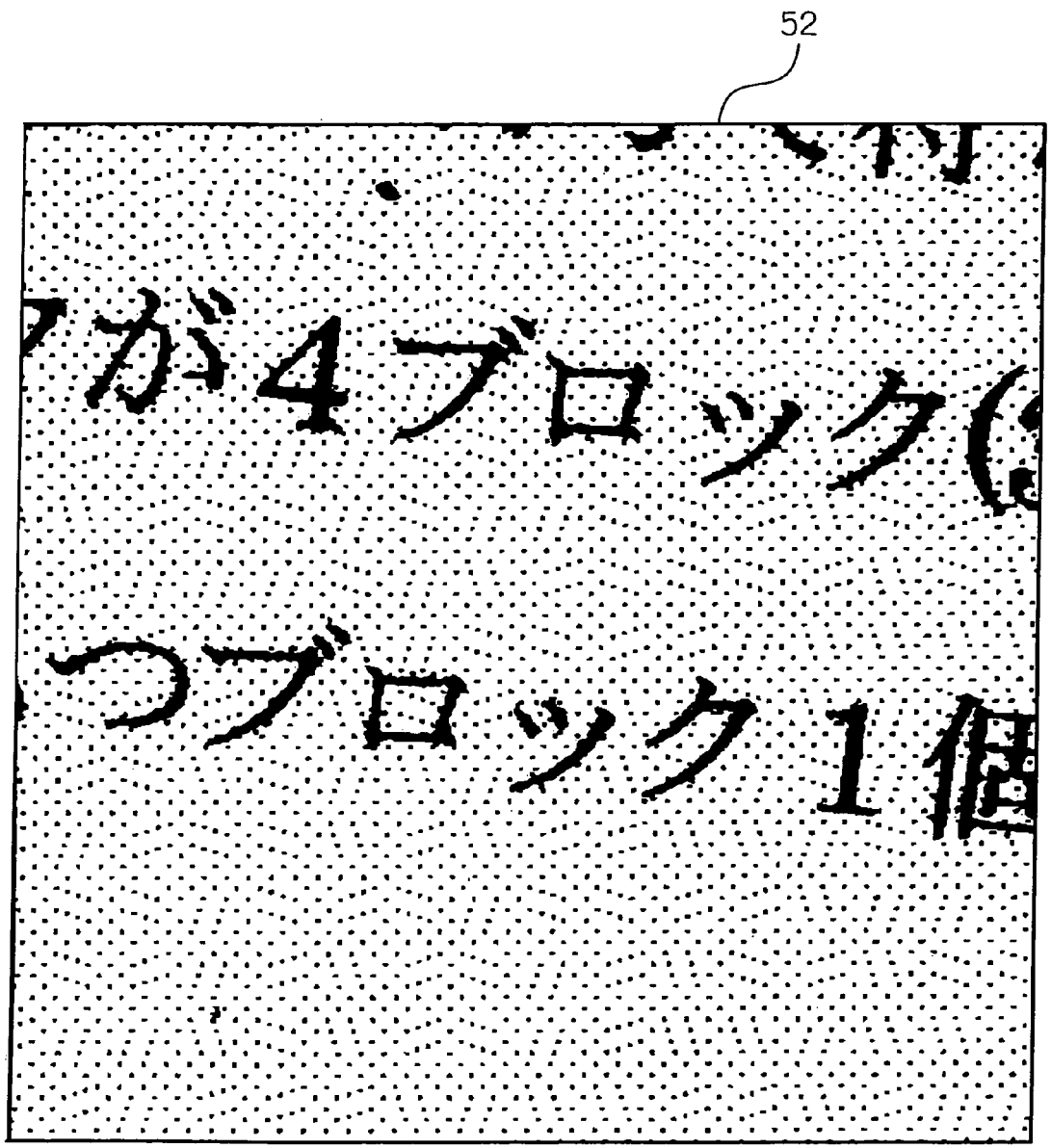
FIG. 19 shows an image including a new watermark signal pattern combined therewith in the document image compositor shown in FIG. 4.

The document image compositor 26 combines the image 46 from the watermark eraser 22, the image 46 having all signal pattern dots of the watermark erased, and the watermark image 50 from the watermark image generator 24. The document image compositor 26 thus produces the watermark-included document image 52 shown in FIG. 19.

The above functions may be implemented by program sequences installed in the computer system described above so that the computer may function as the watermark processing system 10. The computer programs may be commercially available in the form recorded in a predetermined recording medium such as a compact disc read only memory (CD-ROM) or in the form downloaded over a telecommunications network. The same holds true for embodiments of the watermark processing system 10 which will be described below.

Such program sequences for the watermark processing system 10 may be provided in the form of computer-readable recording medium. The program sequences may be written in any of the suitable program languages. The recording medium may be any types of recording medium that are generally and currently available as a recording medium suitable for recording program sequences, such as CD-ROM, a DVD (Digital Versatile Disc)-ROM, a flexible disk, a flash memory, and a built-in memory of a handheld computer, or any recording medium that may be used in the future.

In this way, the watermark processing system 10 may completely erase the watermark from the watermark-embedded printed material and embed a watermark including new, or updated, information into the printed material. The watermark processing system 10 may reduce the watermark degradation after repeated copying.

Figure 20:
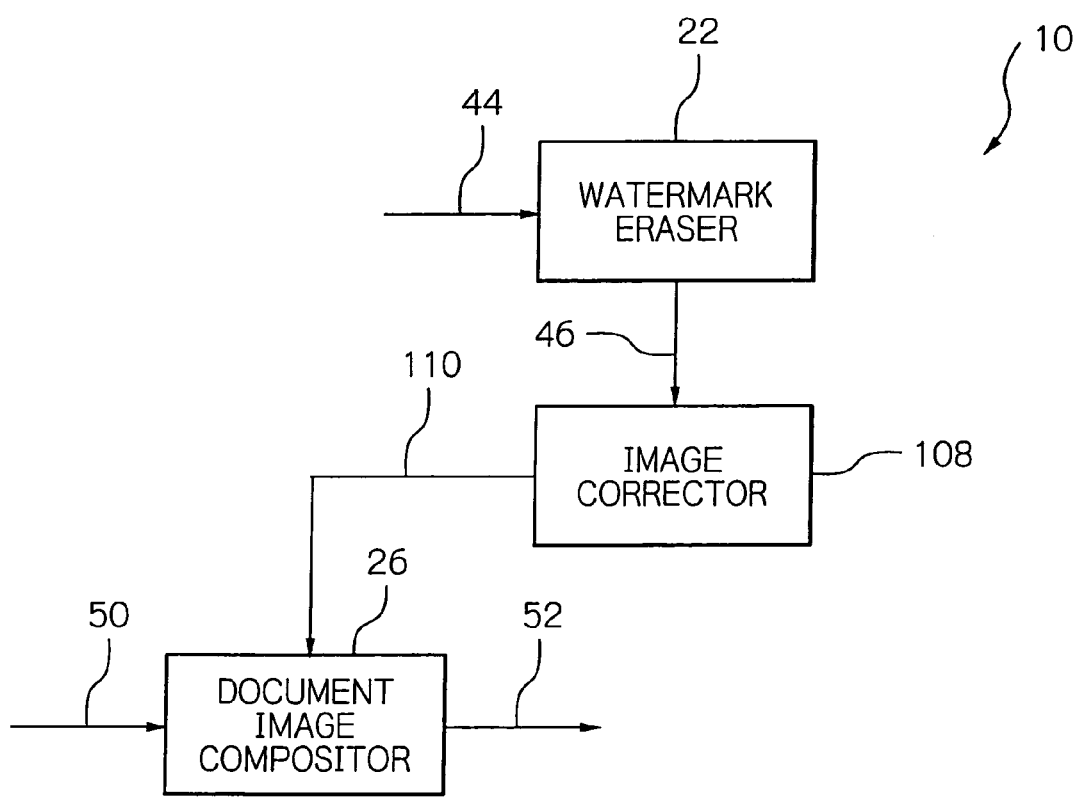
FIGS. 20 through 23 are schematic block diagrams of a configuration of the substantial portion of a watermark processing system including an image processor in accordance with alternative embodiments of the present invention.

The watermark processing system 10 including the image processor in accordance with an alternative embodiment of the present invention will now be described below. With reference to FIG. 20, the watermark processing system 10 includes the constituent elements of the foregoing embodiment plus an image corrector 108, which has a function of providing a rotation correction and a parallel displacement to the watermark-erased image 46 from the watermark eraser 22. The rotation correction and the parallel displacement may be provided using an image processing such as affine conversion. The image corrector 108 supplies a corrected image 110 to the document compositor 26.

The document compositor 26 combines the corrected image 110 with the created watermark image 50 to form a document image 52 thus combined. The document compositor 26 then outputs the document signal 52 to the output device 28.

The operations in the instant alternative embodiment will be described below. The rotation angle of the rotation correction by the image corrector 108 is provided using the rotation angle of the watermark detected by the watermark detector 18. The image corrector 108 uses, when the watermark is divided into blocks in unit of synchronous code, a rotation angle averaged over all blocks or the highest frequency rotation angle.

The parallel displacement is performed so that the area of an image where the watermark is detected is centered in respect of size on the sheet to which the image is copied.

In this way, in accordance with the alternative embodiment, the gradient and arrangement of the printed material are detected and corrected using the watermark pattern. The usability of the copy is thus increased.

Figure 21:
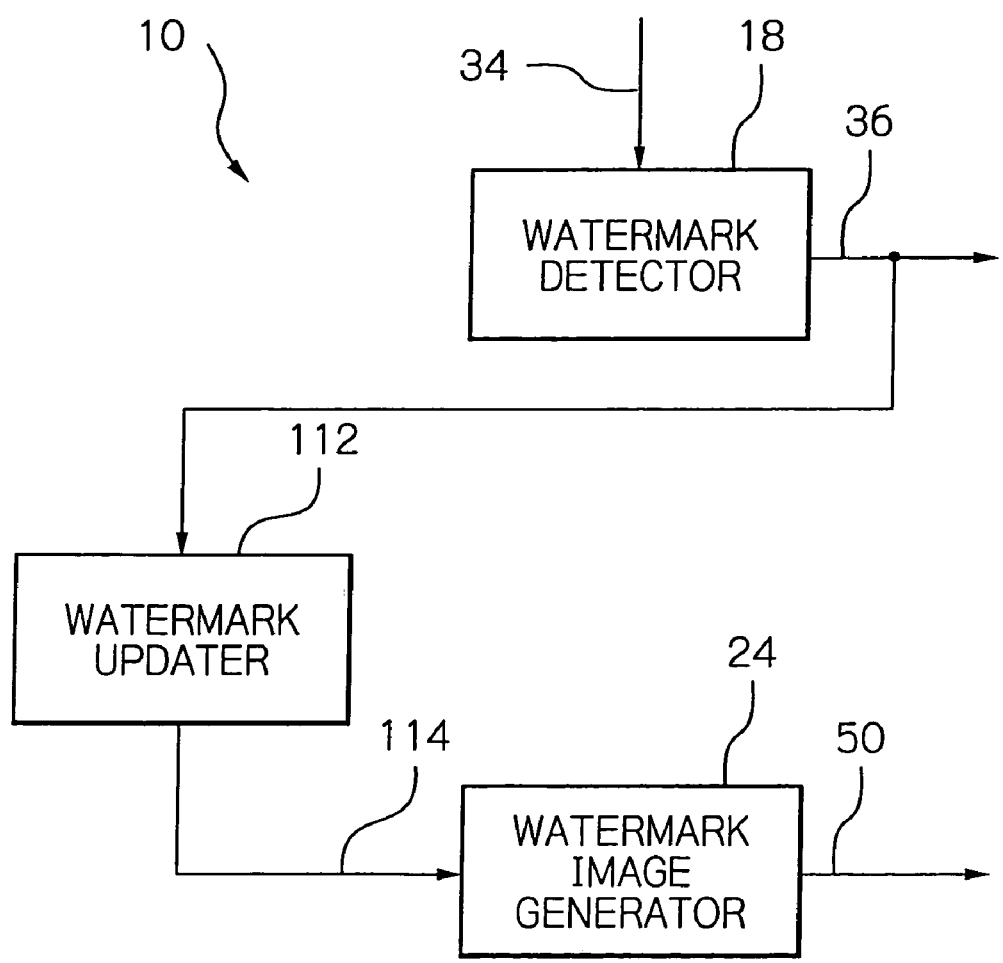

The watermark processing system 10 including the image processor in accordance with another alternative embodiment of the present invention will be described below. With reference to FIG. 21, the watermark processing system 10 includes some of the elements in the first embodiment plus a watermark updater 112, which has a function of generating new, embedded information 114 according to information read out by the watermark detector 18. The watermark updater 112 supplies the watermark image generator 24 with the embedded information 114.

The watermark updater 112 also has a function of adding new information to, updating and deleting some of the read out information during the generation of new information. A first example of addition to the information is to read out information of the copy operator from the copy card reader, and add the information to the copy history. A second example of addition is to read out information of the copier from a memory in the copier, and add the information to the copy history. A third example of addition is to readout the time for the copy from a clock in the copier, and add the information to the copy history. A fourth example of addition is to enter information on distribution on the operation panel during the copying, and add the information as distribution information.

A first example of update of the information is to update the number of copies by adding +1 to the read out number of copies. A second example of update is to update, when information read out by the copy operator is included in the copy history, the number of copies for each copy operator by adding +1 to the number of copies of the relevant copy operator.

An example of deletion of the information is to allow a user having the deletion authority of information to delete the copy history during the copying. The watermark updater 112 then passes the generated embedded information 114 to the watermark image generator 24.

This added constituent element allows addition of new information to, update of, and deletion of some of the embedded information. When, for example, in-house copies are distributed externally, the already embedded copy history is sometimes the in-house confidential information, and in this case, the copy history of the confidential portion may be deleted and the distribution information may be added. In addition, a portion of the embedded information may be updated and embedded again, thus increasing the counted number of copies.

Figure 22:
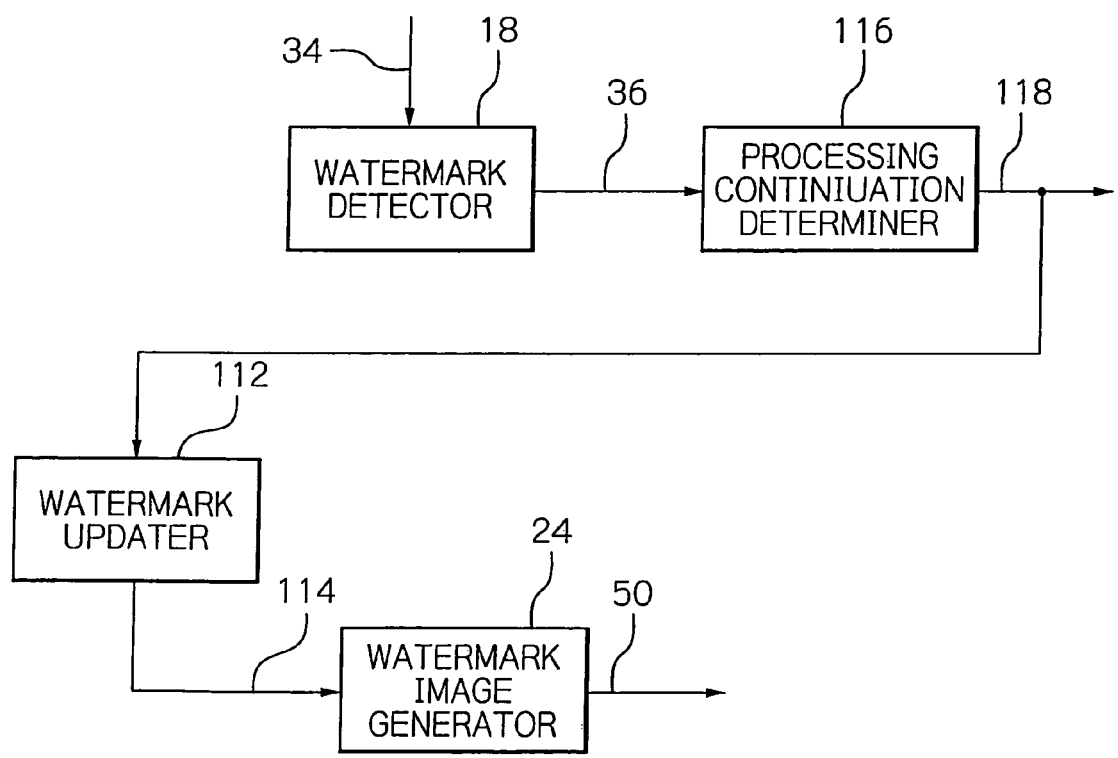

The watermark processing system 10 including the image processor in accordance with a further alternative embodiment of the present invention will be descried below. With reference to FIG. 22, the watermark processing system 10 includes the elements shown in FIG. 21 plus a processing continuation determiner 116. The following description will focus on the differences from the foregoing embodiments. The processing continuation determiner 116 has a function of determining whether to continue the processing according to the read information 36. Depending on the determination results, the processing continuation determiner 116 supplies the read information 36 to the watermark encoder 20 and the watermark updater 112 as information 118.

The operation of the processing continuation determiner 116 will briefly be described. When the embedded information includes the number of copies and the number of copies is equal to or greater than the maximum number of copies stored in the copier, the processing continuation determiner 116 stops the copy and inhibits further processes. With respect to the processing continuation determiner 116, the operator may set the maximum number of copies and embed the maximum number of copies as the embedded information during the printing. In this case, the generation number that may be copied is different for each printed document.

The processing continuation determiner 116 also stops the copy and inhibits further processes when the embedded information includes copy inhibition information. The copy inhibition information may be provided, for example, as permission when the first one bit of the embedded information is binary "1", and as inhibition when the bit is binary "0". The processing continuation determiner 116 may inhibit the copy of the printed materials when the first one bit is set to "1" and the watermark is embedded during the printing.

In this way, the watermark processing system 10 may inhibit the printing according to the embedded information, thereby providing the upper limit in the number of copies. The watermark processing system 10 may also inhibit the copy when the operator adds a copy inhibition flag to the embedded information.

Figure 23:
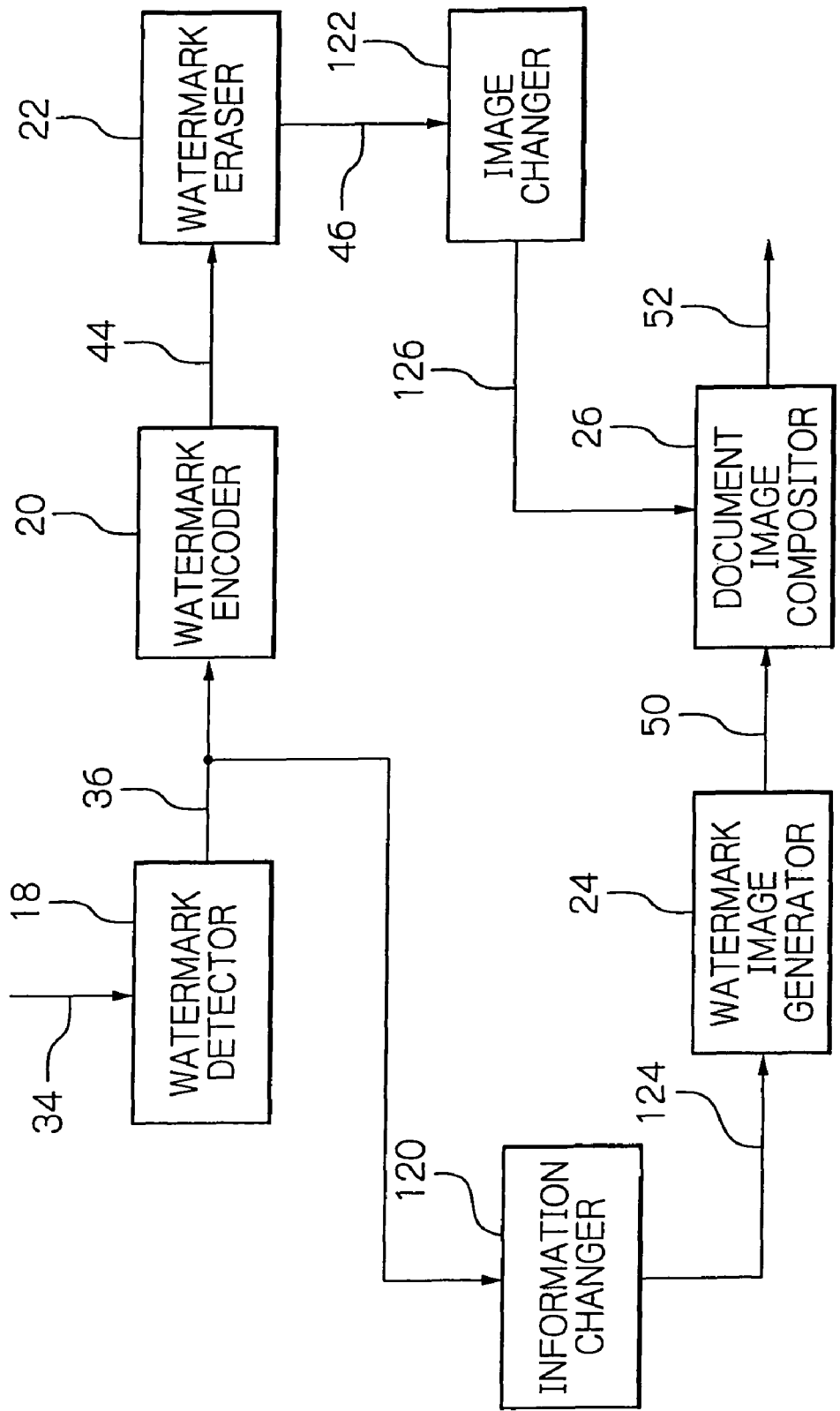

The watermark processing system 10 including the image processor in accordance with a still other alternative embodiment of the present invention will be described below. With reference to FIG. 23, the watermark processing system 10 includes some of the constituent elements in the first embodiment plus an information changer 120 and an image changer 122. The following description will focus on the differences from the first embodiment.

The information changer 120 has a function of directly outputting, when only the magnification/reduction are performed, the input watermark information 36 and changes the information as required. The information changer 120 changes the watermark information 36 as required to provide information 124. The changer 120 then outputs the information 124 to the watermark image generator 24.

The image changer 122 has, for the watermark-erased image 46 from the watermark eraser 22, a magnification/reduction function and the so-called N-up function of printing in reduction plural (N) pages of a document into one page, where N is a natural number. These operations are instructed by the copy operator on the operation panel of the copier. The image changer 122 changes the watermark-erased image 46 as instructed to provide an image 126. The changer 122 then outputs the image 126 to the document image compositor 26.

Figure 24:
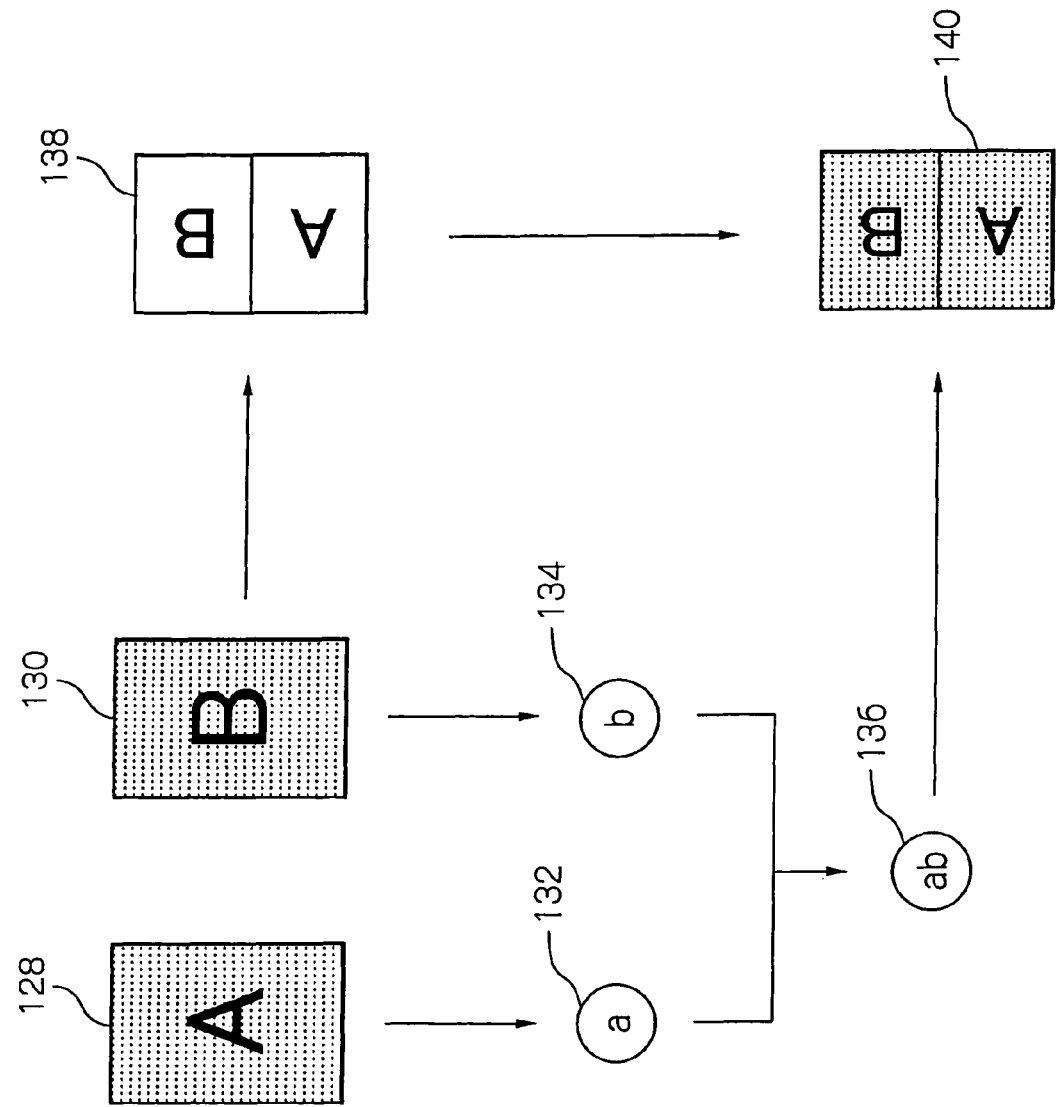
FIG. 24 shows operations of the information extraction, the information change and the image change and composition performed by the system shown in FIG. 23.

The operations of the information changer 120 and the image changer 122 will be described below. The N-up function of the image changer 122 is described exemplarily for N=2. With reference to FIG. 24, the information changer 120 reads out watermark information (a) 132 and (b) 134 from two sheets of printed documents 128 and 130, respectively. The changer 120 then couples the read out information, thereby generating information-changed information (ab) 136. The information changer 120 outputs the information-changed information 136 to the watermark image generator 24 or the document image compositor 26. The watermark processing system 10 may not use the watermark image generator 24, supplying the information-changed information 136 to the document image compositor 26.

Figure 25:
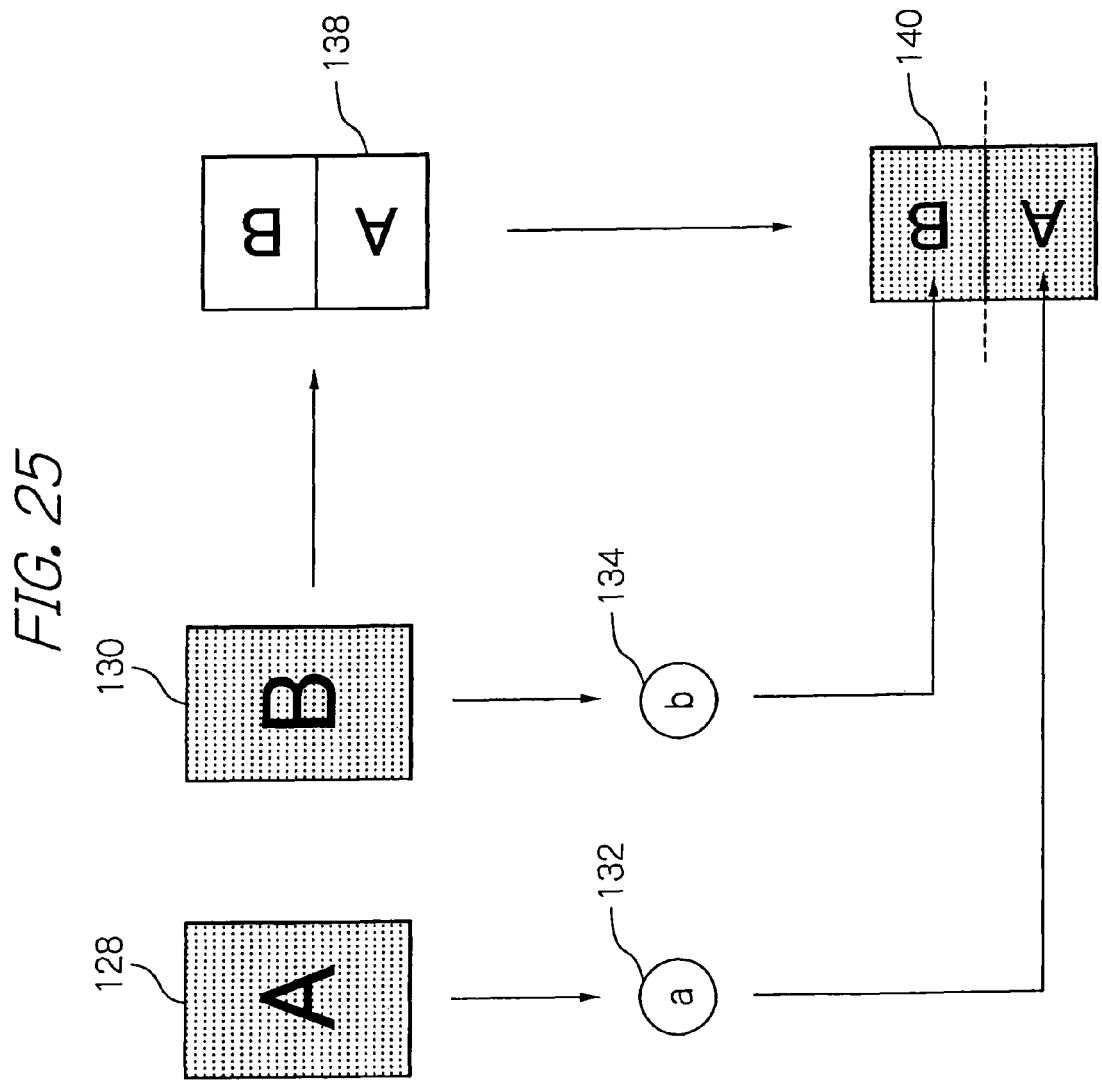
FIG. 25 shows modified operations of the information extraction and the image change and composition performed by the system shown in FIG. 23.

With reference to FIG. 25, the image changer 122 rotates, for example, each of the watermark-erased images from two sheets of printed documents 128 and 130 counterclockwise by 90°. The changer 122 then reduces the images and combines them into a one-sheet combined image 138. The changer 122 then outputs the image 138 to the document image compositor 26. The document image compositor 26 combines the supplied combined image 138 with the supplied information-changed information 136. The document image compositor 26 combines the watermark information with the document image of one sheet including two pages reduced and put together therein to provide a reduced and combined document 140. The compositor 26 then outputs the document 140 to the output device 28.

The N-up function also produces a document image of one sheet including four pages reduced and put together therein by rotating each of the four documents in the same direction and reducing them. Preferably, the information change is generated by coupling four sets of the watermark information in accordance with the document combination.

In this way, the watermark processing system 10 may decrease the degradation during the copying, and particularly, output the document image without the watermark degradation even when the magnification/reduction are performed during the copying. The N-up function may provide printing during the copying without the watermark degradation or any lack of embedded information.

The watermark processing system 10 may not couple information during the N-up and may generate the watermark images including respective information on the respective reduced pages, and combine the watermark images. With reference to FIG. 25, the watermark processing system 10 reads information (a) 132 and (b) 134 from two sheets of printed documents 128 and 130, respectively. The unit 10 then outputs the read information 132 and 134 to the document compositor 26. The watermark processing system 10 rotates each of the watermark-erased images from two sheets of printed documents 128 and 130 counterclockwise by 90°. The unit 10 then reduces the images and combines them into the one-page combined image 138. The unit 10 then outputs the image 138 to the document compositor 26. In combining the images, the document compositor 26 may combine predetermined portions of the original two images 128 and 130 with watermark information representing the information 132 and 134 read from the two images, respectively.

Although, in this alternative embodiment, the watermark eraser 22 has been described with respect to the case where the position and the rotation angle of the signal pattern unit on the document image derived from the watermark detector 18 and the second type indicated by the signal pattern derived from the watermark encoder 20 are used to estimate the dot positions included in the watermark for each signal pattern unit, the present invention is not limited specifically thereto.

The watermark detector 18 may be adapted to identify the watermark resolution and identify, according to the watermark resolution, the dot positions included in the watermark information. The watermark detector 18 may be adapted to read, for example, both at 200 dpi and 400 dpi, recognize the resolution for the appropriate reading as the correct resolution, and identify the dot positions included in the watermark information.

The present invention may be applied to the image processor, the image processing method, and the related technologies. In particular, the present invention may be applied to technologies to convert a printing medium including information embedded in an unreadable format to an electronic form, thereby erasing and updating information embedded in an unreadable format.

The entire disclosure of Japanese patent application No. 2007-47416 filed on Feb. 27, 2007, including the specification, claims, accompanying pictures and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. An image processor for processing an image having information embedded therein and using a fine tint-block pattern as a watermark, comprising:
   a watermark detector that detects first information represented by the watermark from the image;
   an encoder that decodes and error-corrects the first information and re-encodes the first information into second information; and
   a watermark eraser that identifies a position of the tint-block pattern included in the watermark according to the second information and produces a watermark-erased image from which the watermark is erased.

2. The image processor according to claim 1, wherein the watermark includes an arrangement of at least one basic unit watermark,
   said watermark detector identifies a position and an angle of the basic-unit watermark,
   said watermark eraser identifying the position of the tint-block pattern according to a position and an angle of the basic-unit watermark.

3. The image processor according to claim 1, wherein said watermark detector identifies a resolution of the watermark,
   said watermark eraser identifying the position of the tint-block pattern according to the resolution of the watermark.

4. The image processor according to claim 1, wherein the image includes an overlap of a character and the watermark,
   said watermark eraser erasing the tint-block pattern according to the overlap between the tint-block pattern and the character and reproducing a shape of the character.

5. The image processor according to claim 1, further comprising a compositor that combines the watermark-erased image with a watermark representing the second information.

6. The image processor according to claim 5, wherein said compositor combines at least a part of the first information with the second information to form embedded information.

7. The image processor according to claim 1, further comprising:
   an information updater that produces, according to the first information, update information to be embedded in the watermark-erased image; and
   a compositor that combines the watermark-erased image with a watermark representing the update information.

8. The image processor according to claim 5, further comprising an image corrector that corrects the watermark-erased image,
   said compositor combining the watermark-erased image corrected with a watermark.

9. The image processor according to claim 8, wherein said image corrector uses a rotation angle of the watermark to correct rotation of the watermark-erased image.

10. The image processor according to claim 6, further comprising a determiner that determines, according to the first information, whether to continue processing.

11. The image processor according to claim 6, further comprising:
    an information changer that receives a plurality of images, reads out a plurality of sets of first information from the plurality of images, and combines the information to form combined information; and
    an image changer that performs at least one of reduction and rotation on the plurality of images to provide one combined image,
    said compositor combining the combined image with a watermark representing the combined information.

12. The image processor according to claim 6, further comprising an image changer that receives a plurality of images, performs at least one of reduction and rotation on the plurality of images to provide one combined image,
    said compositor combining portions of the combined image which are respectively associated with the plurality of images with watermarks representing the respective first information read out from the plurality of images.

13. The image processor according to claim 6, further comprising a printer that prints the combined image.

14. The image processor according to claim 1, wherein said processor processes the image of a printed document, and further comprises a scanner that senses the printed document to form the image from the document.

15. A method for processing an image having information embedded therein and using a fine tint-block pattern as a watermark, comprising the steps of:
    detecting first information represented by the watermark from the image;

decoding and error-correcting the first information and re-encoding the first information into second information; and identifying a position of the tint-block pattern included in the watermark according to the second information and producing a watermark-erased image from which the watermark is erased.

16. The method according to claim 15, further comprising the step of combining the watermark-erased image with a watermark representing the second information.

17. The method according to claim 15, further comprising the steps of:

producing, according to the first information, update information to be embedded in the watermark-erased image; and combining the watermark-erased image with a watermark representing the update information.

18. A computer program on a non-transitory medium that is readable by a computer and allows the computer to function as an image processor for processing an image having information embedded therein and using a fine tint-block pattern as a watermark, said processor comprising:

a watermark detector that detects first information represented by the watermark from the image;

an encoder that decodes and error-corrects the first information and re-encodes the first information into second information; and a watermark eraser that identifies a position of the tint-block pattern included in the watermark according to the second information and produces a watermark-erased image from which the watermark is erased.

* * * * *